United States Patent
Sardari et al.

(10) Patent No.: US 11,620,800 B2
(45) Date of Patent: Apr. 4, 2023

(54) THREE DIMENSIONAL RECONSTRUCTION OF OBJECTS BASED ON GEOLOCATION AND IMAGE DATA

(71) Applicant: Electronic Arts Inc., Redwood City, CA (US)

(72) Inventors: Mohsen Sardari, Redwood City, CA (US); John Kolen, Foster City, CA (US); Navid Aghdaie, San Jose, CA (US); Kazi Atif-Uz Zaman, Foster City, CA (US); Kenneth Alan Moss, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/366,948

(22) Filed: Mar. 27, 2019

(65) Prior Publication Data

US 2020/0312042 A1    Oct. 1, 2020

(51) Int. Cl.
| | |
|---|---|
| *G06T 19/20* | (2011.01) |
| *G06T 19/00* | (2011.01) |
| *G06T 7/70* | (2017.01) |
| *G06T 7/50* | (2017.01) |
| *G06T 17/05* | (2011.01) |

(52) U.S. Cl.
CPC ............... *G06T 19/20* (2013.01); *G06T 7/50* (2017.01); *G06T 7/70* (2017.01); *G06T 17/05* (2013.01); *G06T 19/006* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 8,774,470 B1 | 7/2014 | Schmidt | |
| 8,964,052 B1 | 2/2015 | Wooley et al. | |
| 9,669,296 B1 | 6/2017 | Hibbert et al. | |
| 9,782,668 B1 | 10/2017 | Golden et al. | |
| 10,186,049 B1 * | 1/2019 | Boardman | G06T 7/75 |
| 10,369,472 B1 | 8/2019 | Mattar et al. | |

(Continued)

OTHER PUBLICATIONS

Kevin Karsch, Varsha Hedau, David Forsyth, Derek Hoiem, "Rendering Synthetic Objects into Legacy Photographs", ACM, Dec. 2011, ACM Transactions on Graphics, vol. 30, No. 6, article 157, pp. 1-12.*

(Continued)

*Primary Examiner* — Robert Bader

(74) *Attorney, Agent, or Firm* — Knobbe, Martens, Olson & Bear, LLP

(57) ABSTRACT

Embodiments of the systems and methods described herein provide a three dimensional reconstruction system that can receive an image from a camera, and then utilize machine learning algorithms to identify objects in the image. The three dimensional reconstruction system can identify a geolocation of a user, identify features of the surrounding area, such as structures or geographic features, and reconstruct the scene including the identified features. The three dimensional reconstruction system can generate three dimensional object data for the features and/or objects, modify the three dimensional objects, arrange the objects in a scene, and render a two dimensional view of the scene.

20 Claims, 15 Drawing Sheets

(56) References Cited

U.S. PATENT DOCUMENTS

| | | |
|---|---|---|
| 10,818,070 B2 | 10/2020 | Liu et al. |
| 10,922,882 B2 | 2/2021 | Liu et al. |
| 11,331,575 B2 | 5/2022 | Mattar et al. |
| 2002/0090985 A1 | 7/2002 | Tochner et al. |
| 2003/0058238 A1 | 3/2003 | Doak |
| 2004/0027344 A1 | 2/2004 | Ohto |
| 2005/0264566 A1 | 12/2005 | Sommers |
| 2006/0223635 A1 | 10/2006 | Rosenberg |
| 2007/0021166 A1 | 1/2007 | Mattila |
| 2008/0146338 A1 | 6/2008 | Bernard et al. |
| 2009/0005140 A1 | 1/2009 | Rose et al. |
| 2009/0102835 A1 | 4/2009 | Mikhailov |
| 2010/0215250 A1 | 8/2010 | Zhu |
| 2010/0306825 A1 | 12/2010 | Spivack |
| 2011/0090215 A1 | 4/2011 | Ohta |
| 2012/0208636 A1 | 8/2012 | Feige |
| 2012/0264518 A1 | 10/2012 | Rouille |
| 2012/0306850 A1* | 12/2012 | Balan .................... G06F 3/0304 345/419 |
| 2014/0104316 A1 | 4/2014 | Sharma et al. |
| 2014/0267273 A1 | 9/2014 | Kontkanen |
| 2014/0278847 A1 | 9/2014 | Gallo |
| 2014/0306866 A1* | 10/2014 | Miller ...................... G06T 7/73 345/8 |
| 2015/0228114 A1* | 8/2015 | Shapira ................. G06K 9/4638 345/421 |
| 2016/0180540 A1* | 6/2016 | Lookingbill ............ G06T 7/593 382/154 |
| 2016/0196596 A1 | 7/2016 | Van Wie et al. |
| 2017/0243352 A1* | 8/2017 | Kutliroff ............... G06T 19/006 |
| 2019/0026956 A1* | 1/2019 | Gausebeck ............ G06T 7/579 |
| 2020/0030700 A1 | 1/2020 | Mattar et al. |
| 2020/0129862 A1 | 4/2020 | Liu |
| 2021/0027531 A1 | 1/2021 | Liu et al. |
| 2021/0082172 A1 | 3/2021 | Liu et al. |

OTHER PUBLICATIONS

M. Zeeshan Zia, Michael Stark, Konrad Schindler, "Towards Scene Understanding with Detailed 3D Object Representations", Nov. 4, 2014, Springer, International Journal of Computer Vision, 112:188-203.*

Shenlong Wang, Sanja Fidler, Raquel Urtasun, "Holistic 3D Scene Understanding from a Single Geo-tagged Image", Jun. 12, 2015, IEEE, Urtasun; Proceedings of the IEEE Conference on Computer Vision and Pattern Recognition (CVPR), 2015, pp. 3964-3972.*

Yangyan Li, Angela Dai, Leonidas Guibas, Matthias Nießner, "Database-Assisted Object Retrieval for Real-Time 3D Reconstruction", Jun. 22, 2015, The Eurographics Association, Computer Graphics Forum, vol. 34, No. 2.*

Angela Dai, Daniel Ritchie, Martin Bokeloh, Scott Reed, Jürgen Sturm, Matthias Nießner, "ScanComplete: Large-Scale Scene Completion and Semantic Segmentation for 3D Scans", Jun. 23, 2018, IEEE, 2018 IEEE/CVF Conference on Computer Vision and Pattern Recognition.*

Hecht et al. "Automatic identification of building types based on topographic databases—a comparison of different data sources," Intl J of Cartograph (2015) vol. 1:1(18-31).

Ingress FAQ. reddit.com. Online. 2015. Accessed via the Internet. Accessed Jul. 31, 2021. <URL: https://www.reddit.com/r/ingress/wiki/faq#wiki_portals> (Year: 2015).

Qi, Jianzhong, et al., "Theoretically Optimal and Empirically Efficient r-trees with Strong Parallelizability." Proceedings of the VLDB Endowment 11.5 (2018): 621-634. (Year: 2018).

Zamri, Muhamad Najib, et al. "Real-Time Data Retrieval Technique for Virtual GIS," Advance in Spatial Information System: Application Development in Geographical Information System, Chapter 10, pp. 197 to 211, Jan. 2007. (Year: 2007).

\* cited by examiner

THREE DIMENSIONAL RECONSTRUCTION OF OBJECTS BASED ON GEOLOCATION AND IMAGE DATA

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Video games have featured three dimensional (3D) reconstructions of real world objects, such as by game artists and developers working to create 3D object data that appears similar to a real object or environment (such as a particular famous landmark or portion of a city) during a development phase of a video game. Some techniques include 3D scanning a real-world object and reconstructing the object as a digital 3D representation. This technique can be used to create highly detailed content for video games. Scanning studios can use their scanning rigs to scan all sorts of objects, ranging from animals, cars, and food. However, manually scanning every object can be a lengthy and time consuming process. Moreover, scanning studios may not be large enough to scan large macro-sized objects, such as buildings or mountains, let alone, move either the scanning studio or the macro-sized objects for scanning.

SUMMARY OF EMBODIMENTS

The systems, methods, and devices of this disclosure each have several innovative aspects, no single one of which is solely responsible for the all of the desirable attributes disclosed herein.

One embodiment discloses a computer-implemented method comprising: receiving an image and a geolocation from a user device; determining, based at least in part by providing the image to a machine learning model, one or more objects depicted in the image; obtaining three dimensional object data corresponding to the one or more objects depicted in the image; generating a three dimensional representation of the one or more objects based on the obtained three dimensional object data; modifying the three dimensional representation of the one or more objects based on characteristics of the corresponding objects as depicted in the image to generate one or more modified three dimensional object representations; arranging the one or more modified three dimensional object representations in a three dimensional virtual space; rendering a two dimensional view of the three dimensional virtual space; determining that a comparison between the two dimensional view and the image meets a threshold requirement; and storing, in an electronic data store, the one or more modified three dimensional object representations as arranged in the three dimensional virtual space, wherein the one or more modified three dimensional object representations are stored with associated geolocation data based on the geolocation from the user device.

In some embodiments, the machine learning model is configured to segment an input image, identify objects in the input image, and determine depths of identified objects in the input image.

In some embodiments, the method further comprises identifying one or more features corresponding to the geolocation from a database, and generating a three dimensional representation of the one or more features.

In some embodiments, the characteristics of the corresponding objects are retrieved from a database that stores data associating geolocation information to object characteristics.

In some embodiments, the characteristics of the corresponding objects are identified by one or more machine learning models.

In some embodiments, the characteristics include at least one of: a height, a width, a length, or a shape.

In some embodiments, arranging the one or more modified three dimensional object representations in the three dimensional virtual space is based on relative location of the one or more objects depicted in the image.

In some embodiments, rendering the two dimensional view of the three dimensional virtual space includes rending the two dimensional view from a virtual camera with a virtual position corresponding to a position of a real camera that captured the image.

In some embodiments, the comparison between the two dimensional view and the image includes determination of a percentage of pixels that meets a threshold requirement from a pixel by pixel comparison.

One embodiment includes a system comprising: one or more processors configured with computer executable instructions that configure the one or more processors to: receive an image and a geolocation from a first user device; determine, based at least in part by providing the image to a machine learning model, one or more objects depicted in the image; generate a three dimensional representation of the one or more objects based on three dimensional mesh and texture data for the one or more objects; modify the three dimensional representation of the one or more objects based on characteristics of the corresponding objects as depicted in the image to generate one or more modified three dimensional object representations; arrange the one or more modified three dimensional object representations in a three dimensional virtual space; render a two dimensional view of the three dimensional virtual space; determine that a comparison between the two dimensional view and the image meets a threshold requirement; and store, in an electronic data store, the one or more modified three dimensional object representations as arranged in the three dimensional virtual space, wherein the one or more modified three dimensional object representations are stored with associated geolocation data based on the geolocation from the first user device.

In some embodiments, the characteristics of the corresponding objects are identified by the machine learning model, and the characteristics are verified based on data obtained from a database that stores data corresponding geolocation data to object characteristics.

In some embodiments, the characteristics of the corresponding objects are obtained from a database that stores data corresponding geolocation data to object characteristics, and the characteristics are verified based on data identified by the machine learning model.

In some embodiments, the one or more processors are further configured to determine whether the two dimensional view meets a probability that the two dimensional view appears real by applying a neural network.

In some embodiments, the first user device includes a mobile phone or an augmented reality device.

In some embodiments, the one or more processors are further configured to cause rendering of the two dimensional view by the first user device.

In some embodiments, the one or more processors are further configured to: receive geolocation data based on a geolocation from a second user device that is within a proximity distance from the geolocation of the first user device; retrieve the three dimensional virtual space with the arranged one or more objects; remodify the three dimensional representation of the one or more objects based on a second image captured by the second user device; and store an updated version of the three dimensional virtual space with the remodified three dimensional representation of the one or more objects.

In some embodiments, the one or more processors are further configured to: generate a rendered scene by generating a fully virtual rendered scene for the first user device; and generate an augmented reality rendered scene for a second user device by retrieving the stored three dimensional virtual space with the arranged one or more objects.

In some embodiments, the one or more processors are further configured to: generate a rendered scene by generating an augmented reality rendered scene for the first user device; and generate a fully virtual rendered scene for a second user device by retrieving the stored three dimensional virtual space with the arranged one or more objects.

One embodiment includes a non-transitory computer-readable storage medium having stored thereon instructions that, when executed, cause at least one processor to: receive an image and a geolocation from a user device; determine, based at least in part by providing the image to a machine learning model, one or more objects depicted in the image; generate a three dimensional representation of the one or more objects based on three dimensional mesh and texture data for the one or more objects; modify the three dimensional representation of the one or more objects based on characteristics of the corresponding objects as depicted in the image to generate one or more modified three dimensional object representations; arrange the one or more modified three dimensional object representations in a three dimensional virtual space; render a two dimensional view of the three dimensional virtual space; determine that a comparison between the two dimensional view and the image meets a threshold requirement; and store, in an electronic data store, the one or more modified three dimensional object representations as arranged in the three dimensional virtual space, wherein the one or more modified three dimensional object representations are stored with associated geolocation data based on the geolocation from the user device.

In some embodiments, the processor is further configured to generate a virtual object that was not identified in the image, and apply a behavioral tree associated with the virtual object to identify behavior and interaction of the virtual object with the identified one or more objects in the image.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION

Overview

Figure 1A:
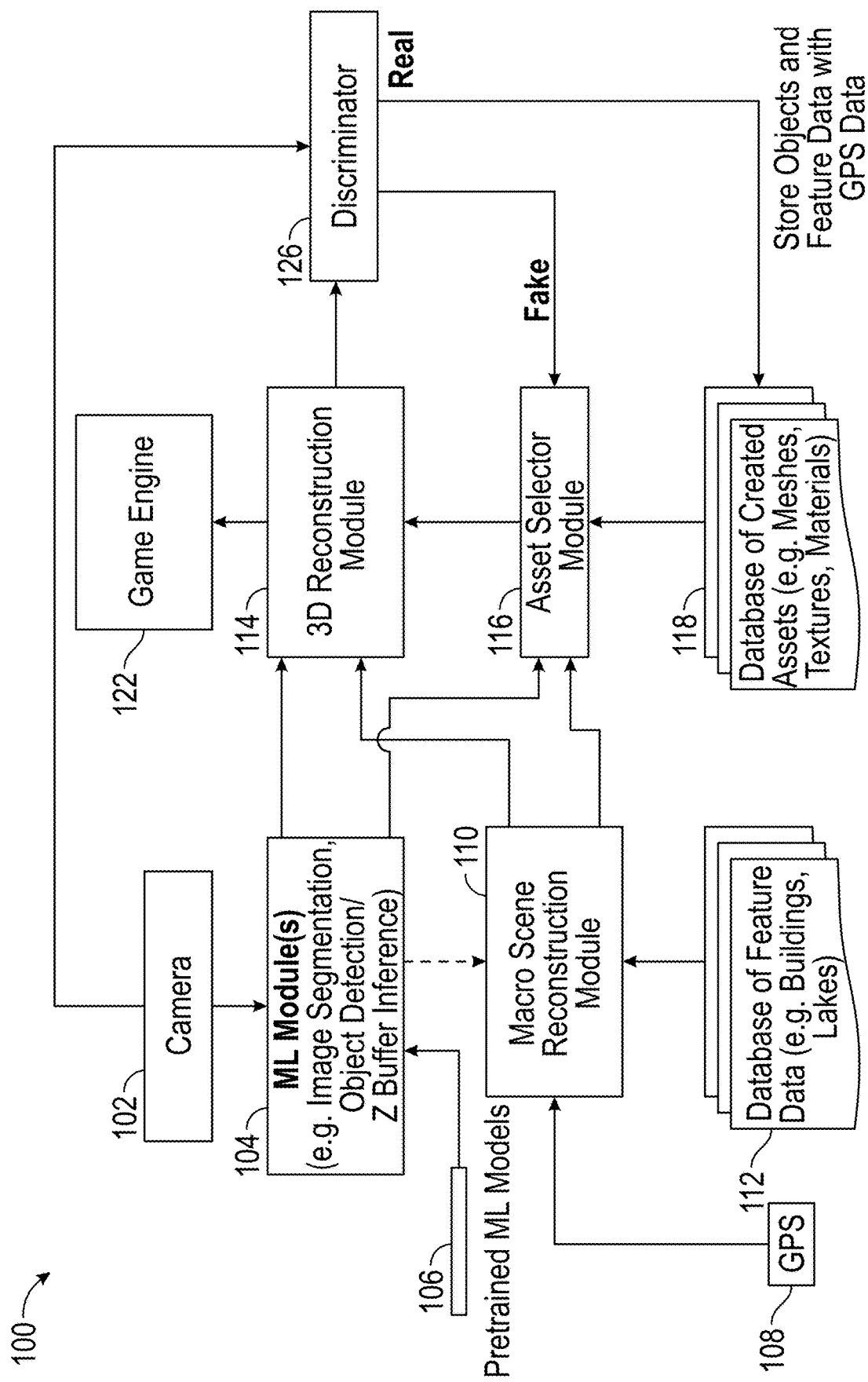
FIG. 1A provides a block diagram of a three dimensional reconstruction system and associated data flow according to some embodiments.

There is a need to effectively and efficiency enable generation of 3D representations for macro features and smaller objects in the real world, and for enabling the virtual appearance of interaction between the macro features, objects, and completely virtual representations. Existing augmented reality game systems may receive an image from a camera, and then detect a particular pattern that matches an object type in their system. The system can then reconstruct a digital version of one or more objects based on template matching and place the objects into the game. However, these three dimensional reconstructions of digital objects are typically static, and do not interact with each other and/or with other completely virtual objects that were not in the image taken from the camera. Moreover, the three dimensional digital reconstructions of objects do not interact with the full scene, such as with macro objects including mountains or buildings.

Existing augmented reality game systems are further limited by the objects identified in the image of the camera. These systems do not have information on portions of objects that may not be seen by the camera or objects that are hidden from the camera. For example, the image may include a front side of a car, but the system does not have information on the shape or texture of the backside of the car. The image may include one side of a building, but may not have data on other sides of the building, which may cast a different shadow on another virtual object than if only the shape of the front of the building was taken into account.

Some embodiments of the present disclosure include a three dimensional reconstruction system that mitigates and/or eliminates the drawbacks of traditional game systems, including existing augmented reality game systems. The three dimensional reconstruction system can receive an image from a camera, utilize artificial intelligence, such as machine learning algorithms, neural networks, modeling, and/or the like to identify objects in the image. The three dimensional reconstruction system can identify a geolocation of a user, identify features of the surrounding area, such as structures or geographic features, and reconstruct the virtual scene to include the identified features. The three dimensional reconstruction system can generate three dimensional representations of the objects identified in the image and the surrounding features of the identified geolocation by using three dimensional meshes and applying textures to the three dimensional meshes.

In some embodiments, the three dimensional reconstruction system can place the three dimensional representations of the objects and surrounding features (such as by a three dimensional reconstruction module) into a scene. The three dimensional reconstruction system can identify a point of view of a user device, such as the camera that took the image, and can render a two dimensional view of the three dimensional reconstruction of the scene that corresponds to the view of the camera.

In some embodiments, the two dimensional view can be inputted into a machine learning model, such as a discriminator, that is trained to predict whether an image looks real or fake. If the three dimensional reconstruction system is able to recreate the three dimensional representation of the scene correctly, the two dimensional view can trick the discriminator to believe the view is real, and not a fake view.

In some embodiments, the three dimensional reconstruction system can check whether the view appears to be correct by comparing the generated two dimensional view with the image taken by the camera. For example, the three dimensional reconstruction system can check between one or more pixels and/or all pixels, via a pixel by pixel comparison whether the two dimensional view is similar to the image (optionally passing the image through one or more filters, edge detection processes, and/or other alterations before comparison). If the total result of the comparison meets a threshold, the three dimensional reconstruction system can determine that the three dimensional reconstruction works correctly, and can then send the three dimensional reconstruction to the game engine to render views for use in the game. In some embodiments, meeting a threshold can include exceeding the threshold, greater than the threshold, greater than or equal to the threshold, less than the threshold, less than or equal to the threshold, and/or the like.

In some embodiments, if the discriminator predicts that the image looks fake and/or if the image comparison does not meet a certain threshold, the three dimensional reconstruction system can try again to reconstruct objects in the scene to fool the discriminator using a different reconstruction of the objects and/or features.

In some embodiments, the game engine renders a two dimensional view of an entirely virtual environment, where virtual objects have been generated and placed into an entirely virtual scene, and the game engine renders the two dimensional view based on a viewpoint within the virtual scene. For example, the image can include a tree and the geolocation features can include a mountain background. The game engine can generate a virtual representation of a mountain and a tree, and place both into an entirely virtual scene. The game engine can further include entirely virtual objects such as a virtual dog that are not in the image and/or not found as a feature for the geolocation.

In other embodiments, the game engine can render a two dimensional view of a three dimensional digital object and place the two dimensional view into the view of a real world view. For example, the game engine can render a two dimensional representation of a three dimensional digital dog playing next to a real tree. The game engine can determine that the area has a tree based on a captured image, and generate a three dimensional mesh of the tree. The three dimensional digital dog can play near the dimensional mesh and interact with the mesh. The game engine can render just the dog on the user display, such as in an augmented reality view that is incorporated within live captured image output from a digital camera of the user's device.

In some embodiments, the three dimensional reconstruction system can render a two dimensional view of a virtual environment and/or three dimensional digital objects in real time while a player is playing in the game. In some embodiments, the three dimensional objects can be saved for a later time. In some embodiments, the three dimensional reconstruction system can render the two dimensional view of the virtual environment and/or three dimensional digital objects to be viewed by another player, in another location, and/or at a later time.

In some embodiments, one or more processes of the macro scene reconstruction module described herein can be performed remotely, such as on a server accessible over a network from a user's computing system. Thus, the user's computing system can send object, image and/or geolocation data to the server, the server can perform and verify the reconstruction of the virtual environment, and the game engine can send back a two dimensional view of the three dimensional virtual environment.

Three Dimensional Reconstruction System Block Diagram

FIG. 1A provides a block diagram of a three dimensional reconstruction system 100 and associated data flow according to some embodiments. In the illustrated embodiment, the three dimensional reconstruction system 100 can include a camera 102, a machine learning (ML) module 104, pre-trained machine learning models 106, a global positioning system (GPS) device or component 108, a macro scene reconstruction module 110, a database of feature data 112, a three dimensional (3D) reconstruction module 114, an asset selector module 116, a database of created assets 118, a discriminator 126, and a game engine 122. In some embodiments, the three dimensional reconstruction system 100 can include more or less components. For example, the three dimensional reconstruction system 100 can receive an image from one or more external sources instead of including a camera 102 to take the image (e.g., the system 100 may be operated on one or more servers, which receive images from a user device's camera over a network).

In some embodiments, the camera 102 can capture an image and/or video of a surrounding area. For example, a user can use his or her mobile phone to capture a picture of a particular view of an area the user is in. In some embodiments, the camera 102 can be part of an augmented reality system. In some embodiments, the three dimensional reconstruction system 100 can receive an image from an external camera 102.

In some embodiments, the image can be inputted into one or more machine learning modules 104. The machine learning module 104 can obtain or access a particular machine learning model to apply from a database of pretrained machine learning models 106. The machine learning module 104 can implement a plurality of machine learning algorithms, such as a first machine learning model to segment an image, and another machine learning model to detect objects. A first machine learning model can be trained to identify one type of object, and a second machine learning model can be trained to identify another type of object.

In some embodiments, the image can be processed through a machine learning model by the machine learning module 104, such as through layers of a neural network. The machine learning module 104 can segment the image. For example, the image can include a picture of a lake, a mountain, and tree. The machine learning module 104 can segment three portions of the image, a first portion of the image for the lake, a second portion of the image for the mountain, and a third portion of the image for the tree.

In some embodiments, the machine learning (ML) module 104 can detect objects in the image. For example, the machine learning module 104 can identify a tree within the second portion of the image. The machine learning module 104 can use object detection to determine these objects, such as a convolutional neural network that is trained to identify objects such as trees in the image.

In some embodiments, the machine learning module 104 may perform a z buffer inference to estimate depth for an object depicted in the image. For example, the machine learning module 104 can perform z buffer inference on a two dimensional view of a tree. The machine learning module 104 can identify that the tree has its shortest z value (e.g., depth value away from the camera) in the middle of the tree, and curves away from the camera to the sides of the tree. Z buffer inference may include determining relative depth between various depicted objects in the image (e.g., that a person in the foreground is closer to the camera than a tree in the background of the image).

In some embodiments, the three dimensional reconstruction system 100 can include a global positioning system 108, and/or other system that identifies a geolocation of a user device of a user. The three dimensional reconstruction system 100 can receive a geolocation of a user from an external system, such as an external global positioning system 108.

In some embodiments, the macro scene reconstruction module 110 can retrieve the geolocation of the user. The macro scene reconstruction module 110 can access a database of feature data to determine whether there is any preexisting feature data stored for the geolocation or within a certain geographic proximity of the geolocation (e.g., within a certain radius of the geolocation, or within a certain distance in the direction that the camera is facing). For example, the user can be located in a mountainous area. The macro scene reconstruction module 110 can identify whether there is a database of feature data 112 for the mountains. The database of feature data 112 can include map data and/or topological data to retrieve width and length dimensions of a feature. The database 112 can be internal to the three dimensional reconstruction system 100, and/or pulled from a third party database 112, such as a database of topological data or geographic map data. In some embodiments, the database of feature data 112 can include Light Detection and Ranging (LIDAR) data that includes height data. LIDAR data can be used to determine height, width, and length of a building, for example. In some embodiments, the database of feature data 112 can include general dimension data, such as a rectangular polygon data for a building. In some embodiments, the database of feature data 112 can include a location for a particular feature, such as a location of a building.

In some embodiments, the macro scene reconstruction module 110 can receive an indication of the objects in the image from the machine learning module 104. The macro scene reconstruction module 110 can verify and/or supplement the feature data and/or retrieve particular feature data based on the objects detected in the machine learning module 104. For example, the machine learning module 104 may determine a height for a building and can be used to access corresponding building feature data. The macro scene reconstruction module 110 can verify and/or supplement data related to the objects detected in the machine learning module 104 based on the feature data for the geolocation.

In some embodiments, the macro scene reconstruction module 110 can send the feature data and/or the machine learning module can send the identified objects to the asset selector module 116. The asset selector module 116 can access a database of created assets 118 that can include meshes, textures, and/or materials. The asset selector module 116 can generate a three dimensional representation of an object and/or feature based on the accessed data from the database of created assets 118. For example, the asset selector module 116 can generate a tree identified in the image and/or a mountain identified by the macro scene reconstruction module 110 by retrieving the three dimensional mesh and textures for the tree and mountain.

In some embodiments, the asset selector module 116 may access data for a specific feature and/or object based on the location of the user. For example, the asset selector module 116 may access mesh and texture data of a particular building in close proximity of the user.

In some embodiments, the asset selector module 116 can access a particular three dimensional mesh and texture for a building, but may not match certain characteristics of the building, such as an identified height, width, length, and/or shape. The characteristics of the building can be retrieved from the object detection by the machine learning module 104 and/or the macro scene reconstruction module 110. The asset selector module 116 can modify the mesh and/or texture to match the identified characteristics of the feature and/or object.

In some embodiments, the asset selector module 116 can identify and modify the three dimensional reconstruction of the feature and/or object. For example, the object detected in the machine learning module can include a tree that is of a certain height and a certain type. The asset selector module 116 can modify the three dimensional mesh and/or texture to match the identified characteristics of the object. The macro scene reconstruction module 110 can identify a building of a certain shape, height, width, and length. The database of created assets 118 may have a 3D mesh and a texture of a similar building that is of a different shape, height, width, and length. The asset selector module 116 can modify the three dimensional representation of the building to match the shape, height, width, and length characteristics of the building.

In some embodiments, the asset selector module 116 may not have data for a particular feature and/or object. For example, the macro scene reconstruction module 110 may identify a building near a user, but the asset selector module 116 may not have the particular three dimensional mesh and/or the texture for the building. The asset selector module 116 can identify a generic mesh and/or texture based on certain characteristics, such as an identified height, shape, and/or the like. The asset selector module 116 can identify generic characteristics based on a geolocation, such as typical shapes and textures of buildings for the general location of the user.

In some embodiments, the asset selector module 116 can generate an object that was not identified by the machine learning module 104 in the image and/or not identified as a feature in proximity of the geolocation identified by the global positioning system. For example, the asset selector module 116 can generate a virtual dog that was neither identified in the image, nor determined to be a feature for the geolocation of the user. This object, such as a virtual dog, may be part of a video game that is being played by the user whose camera captured the image being analyzed.

In some embodiments, the macro scene reconstruction module 110 can send the feature data and/or the machine learning module can send the identified objects to the three dimensional reconstruction module 114. The asset selector module 116 can send the three dimensional representations of the object and/or feature to the three dimensional reconstruction module 114.

In some embodiments, the three dimensional reconstruction module 114 can place the three dimensional reconstruction of the objects and/or features in a three dimensional virtual environment, such as a virtual scene. For example, the three dimensional reconstruction module 114 can generate a three dimensional virtual space and place the three dimensional representation of the mountains on the far end, a three dimensional representation of the lake nearby, and a three dimensional representation of the tree in the middle of the space.

In some embodiments, the three dimensional reconstruction module 114 can identify the locations and/or relative locations of the objects and/or features based on the image captured by the camera 102. For example, the image can indicate that the tree is closer to the lake but further from the mountain.

In some embodiments, the macro scene reconstruction module 110 can indicate the locations and/or relative locations of the objects and/or features based on the image captured by the camera 102. For example, the database of feature data can indicate that the lake is 20 miles north west from the mountain, which may be difficult to determine based only on an image taken from a particular angle that shows a small portion of the mountain.

In some embodiments, the three dimensional reconstruction module 114 can generate a two dimensional view of the three dimensional scene. The three dimensional reconstruction module 114 can identify the location of the camera 102 based on the geolocation received from the global positioning system 108. For example, the user can be at the south east part of the lake on the opposite side of the mountain from the lake, where the mountain is on the north west part of the lake. The geolocation can indicate this position of the user.

In some embodiments, the three dimensional reconstruction module 114 can determine an angle of view for the camera 102 based on of the machine learning module 104, such as based on the image segmentation, the object detection, and/or the z buffer inference of the machine learning module 104. For example, the camera can be pointed directly north, showing only a portion of the mountain on the right side of the image. The three dimensional reconstruction module 114 can identify that the camera is pointed directly north based on the location of the mountain object identified in the image. The three dimensional reconstruction module 114 can create a two dimensional view that matches the view of the image from the camera 102.

In some embodiments, the three dimensional reconstruction module 114 can generate a light source in the virtual environment. The three dimensional reconstruction module 114 can perform ray tracing to generate shadows based on the light sources for the three dimensional representations of the objects and/or the features. The three dimensional reconstruction module 114 can include the generated shadows into the two dimensional view of the three dimensional scene.

In some embodiments, the three dimensional reconstruction module 114 can transmit the two dimensional view of the three dimensional scene to a discriminator 126. The discriminator 126 can make a determination on whether the image looks real and/or fake. The discriminator 126 can be trained to determine whether the image looks like a real image or a fake image. For example, the discriminator 126 may forward propagate the two dimensional view through layers of a neural network trained to determine whether the image looks real and/or fake and output a binary determination of real and/or fake, or a probability that the image is real. As discussed above, the discriminator may additionally or alternatively at this point compare the actual camera-captured image to the reconstructed 3D rendering to determine whether differences meet an acceptable threshold.

In some embodiments, if the two dimensional view of the three dimensional scene created by the three dimensional reconstruction module 114 is determined to look fake by the discriminator, then the asset selector module 116 can modify one or more objects and/or features, the three dimensional reconstruction module 114 can modify the placement of the objects and/or features into the virtual scene, and/or the three dimensional reconstruction module 114 can modify the view to generate the two dimensional view. The three dimensional reconstruction module 114 can then recreate the two dimensional view with the modified objects and/or features and again try to cause a "real" determination by the discriminator 126.

In some embodiments, if the discriminator 126 determines that the two dimensional view is a real view (which may not occur until multiple trials of altering the 3D reconstruction data have occurred), the discriminator 126 can compare the original image from the camera 102 with the two dimensional view. For example, the comparison can be performed by comparing pixel by pixel. If the comparison exceeds a certain threshold, then at block 120, the objects and/or features can be saved in the database of created assets 118. For example, the comparison can include a threshold for a difference for the color in each pixel, and a determination on whether a certain percentage of pixels exceed the comparison threshold. In other embodiments in which texture is not a focus of the discriminator (e.g., where the real objects will not be rendered in virtual form within a game, but rather only collision data or bounding shape information of those real objects is used), the discriminator may compare general shape information, segmentation, and/or detected edges between the original image and the rendered image.

In some embodiments, saved objects and/or features can be retrieved by another user that wants to play and/or review in the same virtual environment, by the same user at a different time, and/or another user that enters the same physical proximity as the original user. The objects and/or features with the virtual environment can be sent from the three dimensional reconstruction module 114 to the game engine 112. For example, saved objects can be tagged in the database 118 with precise geolocation data for effective reuse. The breadth and quality of the stored objects in a given geographic area may thus improve over time as users play games or otherwise use the system. Furthermore, there are computational efficiencies by not creating new virtual objects for a given real world object when the same real world object has previously been analyzed by the system.

In some embodiments, the stored objects and/or features that was determined to appear "real" by the discriminator 126 and/or exceeded a certain threshold of comparison from the original image can be reused for similar objects and/or features in different locations. For example, the discriminator 126 may determine that a tree looks real and/or meets a certain threshold of comparison from the original image. The tree can be saved to be placed in a virtual environment for a user in a completely different location, and/or for a user later entering the same location.

Three Dimensional Reconstruction System Block Diagram

Figure 1B:
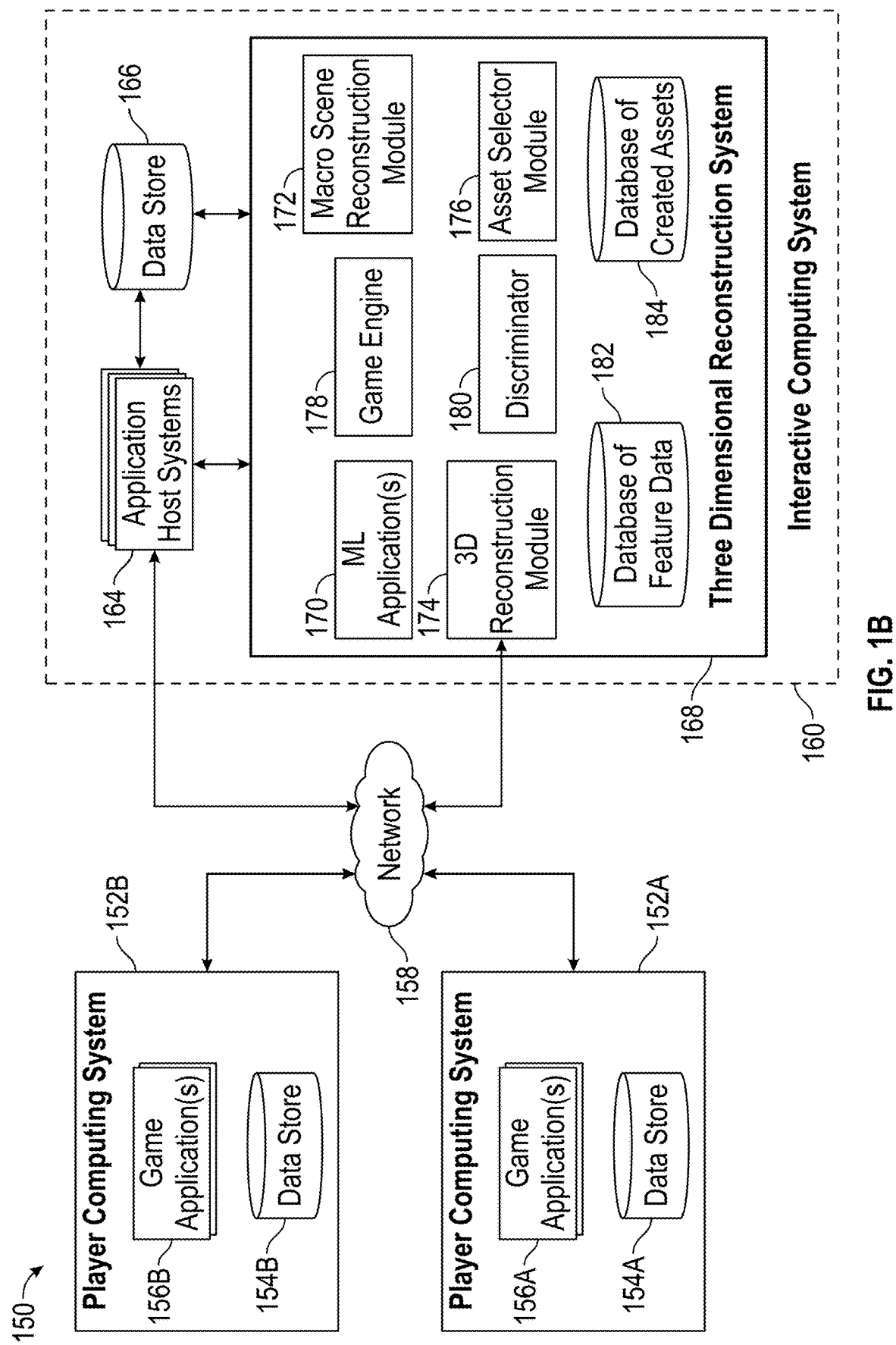
FIG. 1B illustrates an embodiment of a computing environment for implementing one or more embodiments of the present disclosure.

FIG. 1B illustrates an embodiment of a computing environment for implementing one or more embodiments of the present disclosure. The environment 150 includes a network 158, one or more player computing systems 152A, 152B (either of which may individually be referred to herein as player computing system 152), and an interactive computing system 160. To simplify discussion and not to limit the present disclosure, FIG. 1B illustrates only two player computing systems 152A, 152B and one interactive computing system 160, though multiple systems may be used.

The interactive computing system 160 can include application host systems 164, one or more data stores 166, and a three dimensional reconstruction system 168. The three dimensional reconstruction system 168 can communicate with data store 166 and/or with the application host systems 164 to acquire data associated with a game application. The three dimensional reconstruction system 168 can additionally or alternatively communicate with player computing system 152 and/or one or more third party data sources through the network 158. Although only one network 158 is illustrated, multiple distinct and/or distributed networks may exist. The various systems and other components illustrated in FIG. 1B, including interactions or communications between them, will now be described in more detail below.

A. Interactive Computing System

In the illustrated embodiment, the interactive computing system 160 includes application host systems 164, a data store 166, and a three dimensional reconstruction system 168. These systems may communicate with each other. For example, the three dimensional reconstruction system 168 can obtain data associated with a game application from the application host systems 164 and can provide object and/or feature data to the application host systems 164 and/or for storage in the data store 166. The application host systems 164 can communicate with the data store 166 to execute and/or host a game application. In certain embodiments, the interactive computing system 160 may be associated with a network-based service, which may be operated by a game publisher, game developer, platform provider or other entity.

1. Application Host Systems and/or Game Engine

The application host systems 164 and/or the game engine 178 can be configured to execute a portion of the game application 156A operating on the player computing system 152A and/or a host application (not illustrated) on the interactive computing system 160. Further details are described regarding the application host systems 164 below, but can be performed by the game engine 178, or a combination thereof. In certain embodiments, the application host systems 164 may execute another application instead of or in addition to executing a portion of the game application 156A and/or a host application, which may complement and/or interact with the game application 156A during execution of a gameplay session of the game application 156A.

The interactive computing system 160 may enable multiple players or computing systems to access a portion of the game application(s) 156A and/or 156B and/or a host application. In some embodiments, the portion of a game application executed by application host systems 164 of the interactive computing system 160 may create a persistent virtual world. This persistent virtual world or virtual environment may enable one or more players to interact with the virtual world and with each other in a synchronous and/or asynchronous manner. In some cases, multiple instances of the persistent virtual world may be created or hosted by the interactive computing system 160. A set of players may be assigned to or may access one instance of the persistent virtual world while another set of players may be assigned to or may access another instance of the persistent virtual world.

In some embodiments, the application host systems 164 may execute a hosting system for executing various aspects of a game environment. For example, in one embodiment, the game application 156A and/or 156B may be a competitive game, such as a first person shooter or sports game, and the host application system 122 can provide a dedicated hosting service for hosting multiplayer game instances or facilitate the creation of game instances hosted by player computing devices. In some embodiments, the application host systems 164 can provide a lobby or other environment for players to virtually interact with one another. In some embodiments, the virtual environments may be populated with one or more virtual characters, objects, and/or features generated by the three dimensional reconstruction system 168, as well as one or more characters, objects, and/or features designed by a game developer.

2. Three Dimensional Reconstruction System

As will be described in further detail herein, the three dimensional reconstruction system 168 can communicate with other systems to acquire media and other data, may generate one or more custom virtual characters based on the media and other data, and then may make these virtual characters available for use as an NPC or player-controlled character within a game or other virtual world. The three dimensional reconstruction system 168 can include one or more systems, subsystems or components for implementing various functionality described herein. For example, the three dimensional reconstruction system 168 can include a machine learning module or application 170, a macro scene reconstruction module 172, a three dimensional reconstruction module 174, an asset selector module 176, a game engine 178, a discriminator 180, a database of feature data 182, and a database of created assets 184. These example systems or components are not intended to be limiting, and the three dimensional reconstruction system 168 may include fewer or more systems or components than illustrated or described.

The three dimensional reconstruction system 168 and its various systems or components may be distributed across multiple computing systems. The various systems of the three dimensional reconstruction system 168 can communicate with each other to obtain data, analyze data, and generate virtual object and/or scene data. While various systems are illustrated as part of the interactive computing system 160 and/or three dimensional reconstruction system 168, it will be appreciated that each system's functionality could be implemented by a different or multiple computing systems or devices. Furthermore, a single system could implement functionality described herein as being provided or implemented by multiple systems in communication with each other. Similarly, functionality described as being provided by the three dimensional reconstruction system 168 of the interactive computing system 160 could instead be implemented at a player computing system 152, in other embodiments. Each system or component of the three dimensional reconstruction system 168 is described generally below, with associated functionality further described subsequently with respect to other figures.

a. Machine Learning Module

The machine learning module 170 may be configured to segment an image, identify objects of an image, and/or perform depth analysis on an object identified in an image, depending on the embodiment. For example, as described further herein, the machine learning module 170 may receive images (such as digital photographs or a live stream of image or video data captured by a camera), videos and/or other media items or files from the player computing systems 152A or 1528, and/or other source. The machine learning module 170 may be configured to communicate via various APIs or other protocols specific to a particular service or system that stores particular media data.

In some embodiments, the machine learning module 170 may perform initial analysis of the media prior to providing the media or related data to the three dimensional reconstruction module 174. For example, the machine learning module 170 may perform image segmentation analysis, object detection, and/or provide the input media as input to various machine learning models. The machine learning module 170 may employ various modeling techniques or approaches, such as deep neural network models.

b. Macro Scene Reconstruction Module

The macro scene reconstruction module 172 may be configured to identify a geolocation of a user and generate feature data unique to the geolocation. As will be described below, the macro scene reconstruction module 172 may output a model of macro data, such as a polygon of a building, mesh and/or texture data of a mountain, a general location for a lake, and/or the like. The macro scene reconstruction module 172 can access data from the database of featured data 182 based on a geolocation received from a player computing system 152. The macro scene reconstruction module 172 can send the feature data to the three dimensional reconstruction module 174 to arrange the feature onto a virtual space and/or the asset selector module 174 to retrieve pre-existing mesh and/or texture data, and/or morph the mesh and/or texture data based on feature data received by the macro scene reconstruction module 172.

c. Three Dimensional Reconstruction Module

The three dimensional reconstruction module 174 may be configured to arrange feature data and/or object data received from various modules in 3D virtual space. For example, the three dimensional reconstruction module 174 can receive object and/or feature data from the asset select module 176, and determine the arrangement based on the input from the three dimensional reconstruction module 174 and/or the machine learning module 170. The three dimensional reconstruction module 174 can generate a two dimensional view of the three dimensional space, corresponding to a view of a player computing system 152 and send the view to the discriminator. The three dimensional reconstruction module 174 can send to the game engine 178 and/or the application host system 164 the three dimensional virtual space to use in-game.

d. Asset Selector Module

The asset selector module 176 may be configured to retrieve texture or mesh data from the database of feature data 182, and generate virtual representations of objects and/or features based on the retrieved texture or mesh data. The asset selector module 176 can select and/or modify the object and/or feature data based on information received from the machine learning module 170 and/or the macro scene reconstruction module 172. For example, the asset selector module 176 can select a particular texture that the machine learning module 170 identifies for a building. The asset selector module 176 can send the virtual representations of the objects and/or features to the three dimensional reconstruction module 174 to place into the virtual space.

e. Discriminator

The discriminator 180 may be configured to determine whether an image appears real or fake. The discriminator 180 can be implemented by a machine learning model, such as a deep neural network. The discriminator 180 can receive a two dimensional view of the three dimensional scene from the three dimensional reconstruction module 174 and forward propagate the view through the layers of its neural network. The discriminator 180 can output a binary indication of whether the image appears real/fake a probability that the image is real, and/or the like. The discriminator 180 can receive an image from the payer computing system 152, or other component, and compare the image with the two dimensional view to see whether the views appear similar. If the discriminator 180 outputs a fake indication or that the images are not similar, the asset selector can remodify features and/or objects, the three dimensional reconstruction module can rearrange the objects and/or features, and/or the three dimensional reconstruction module can change the virtual camera angle within the three dimensional virtual space to run through the discriminator again. If real, the discriminator 180 can save the object and/or feature data to the database of created assets 184, and use the results in-game.

f. Database of Feature Data

The database of feature data 182 can be configured to store data for geographic locations (such as a map of a particular city, general land structures in an area, LIDAR data, locations of land structures, general shapes of structures such as polygon shapes of buildings, etc.). The database of feature data 182 may be distributed across multiple computing devices (see for example computing device 10 in FIG. 7). In some embodiments, the database of feature data 182 may be network-based storage system where data may be stored in different locations.

g. Database of Created Assets

The database of created assets 184 can be configured to store data such as generic 3D models (such as models for generic buildings and mountains, etc.), as well as custom 3D models (such as particular buildings in New York City, or a model of the Rocky mountains) generated by the asset selector module 176. The database of created assets 184 may be distributed across multiple computing devices (see for example computing device 10 in FIG. 7). In some embodiments, the database of created assets 184 may be network-based storage system where data may be stored in different locations.

3. Data Store of Interactive Computing System

The interactive computing system 160 can include a data store 166. The data store 166 can be configured to store data acquired by other systems, such as, for example, telemetry data, video data, game state information, user data, or the like. In some embodiments, the data store 166 may store user account data associated with a video game publisher, a game platform provider or other service that enables a user to maintain preferences, virtual characters, avatars, achievements, and/or other data across a plurality of different video games. The data store 166 may be distributed across multiple computing devices (see for example computing device 10 in FIG. 7). In some embodiments, the data store 166 may be network-based storage system where data may be stored in different locations.

B. Player Computing System

Each of the player computing system 152A and player computing system 152B (each individually referred to as player computing system 152) can be controlled by a user, such as a player of a video game. The player computing system 152 may include hardware and software components for establishing communications over a communication network 158. For example, the player computing system 152 may be equipped with networking equipment and network software applications (for example, a web browser) that facilitates communications via one or more networks (for example, the Internet or an intranet). The player computing system 152 may have varied local computing resources such as central processing units and architectures, memory, mass storage, graphics processing units, communication network availability and bandwidth, and so forth. Further, the player computing system 152 may include any type of computing system. For example, the player computing system 152 may include any type of computing device(s), such as desktops, laptops, game application platforms, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the player computing system 152 may include one or more of the components or embodiments described below.

1. Game Application(s) and Host Application System

The player computing system 152 is capable of executing one or more game applications 156 (shown as 156A and 156B on different player computing systems 152A and 152B), which may be stored and/or executed locally and/or in a distributed environment. In a locally executed game application 156, generally, the game does not rely or utilize an external computing system (for example, the interactive computing system 160) to execute the game application. In some instances, a locally executable game can communicate with an external server to retrieve information associated with the game, such as game patches, game authentication, clouds saves, custom virtual character data, user account data, or other features. In distributed game applications, the player computing system 152 may execute a portion of a game and the interactive computing system 160, or an application host system 122 of the interactive computing system 160 may execute another portion of the game. For instance, the game may be a massively multiplayer online role-playing game (MMORPG) that includes a client portion executed by the player computing system 152 and a server portion executed by one or more application host systems 164. For the present discussion, the type of game application 156 can be a locally executable game, a distributed application, or an application that includes a portion that executes on the player computing system 152 and a portion that executes on at least one of the application host systems 164.

2. Player Data Store

The player computing system 152 can include a data store 154 (shown as 154A and 154B on different player computing systems 152A and 152B). The data store 154 can be configured to store data associated with one or more game applications 156, local account data associated with an account maintained for the player by the interactive computing system 160, virtual characters created by the player that are usable in one or more games, and/or other game-related or account-related data. The data store 154 may be distributed across multiple computing devices (see for example computing device 10 in FIG. 7).

C. Other Considerations

Although the various systems are described separately above, it should be noted that one or more of these systems may be combined together. For example, the interactive computing system 160 may provide functionality similar to one or more player computing systems 152. Additionally, one or more of the systems may be executed by the same computing device (see for example, computing device 10 in FIG. 7) or by a different computing system than illustrated in FIG. 1B. For example, the three dimensional reconstruction system 168 may be executed on the same computing device as the player computing system 152. On the other hand, one or more systems may be executed by multiple computing devices. For example, a portion or subsystem of the three dimensional reconstruction system 168 may be implemented by a player's personal computer or the player computing system 152 while another portion or subsystem may be implemented by a server.

Game Engine Block Diagram

Figure 2:
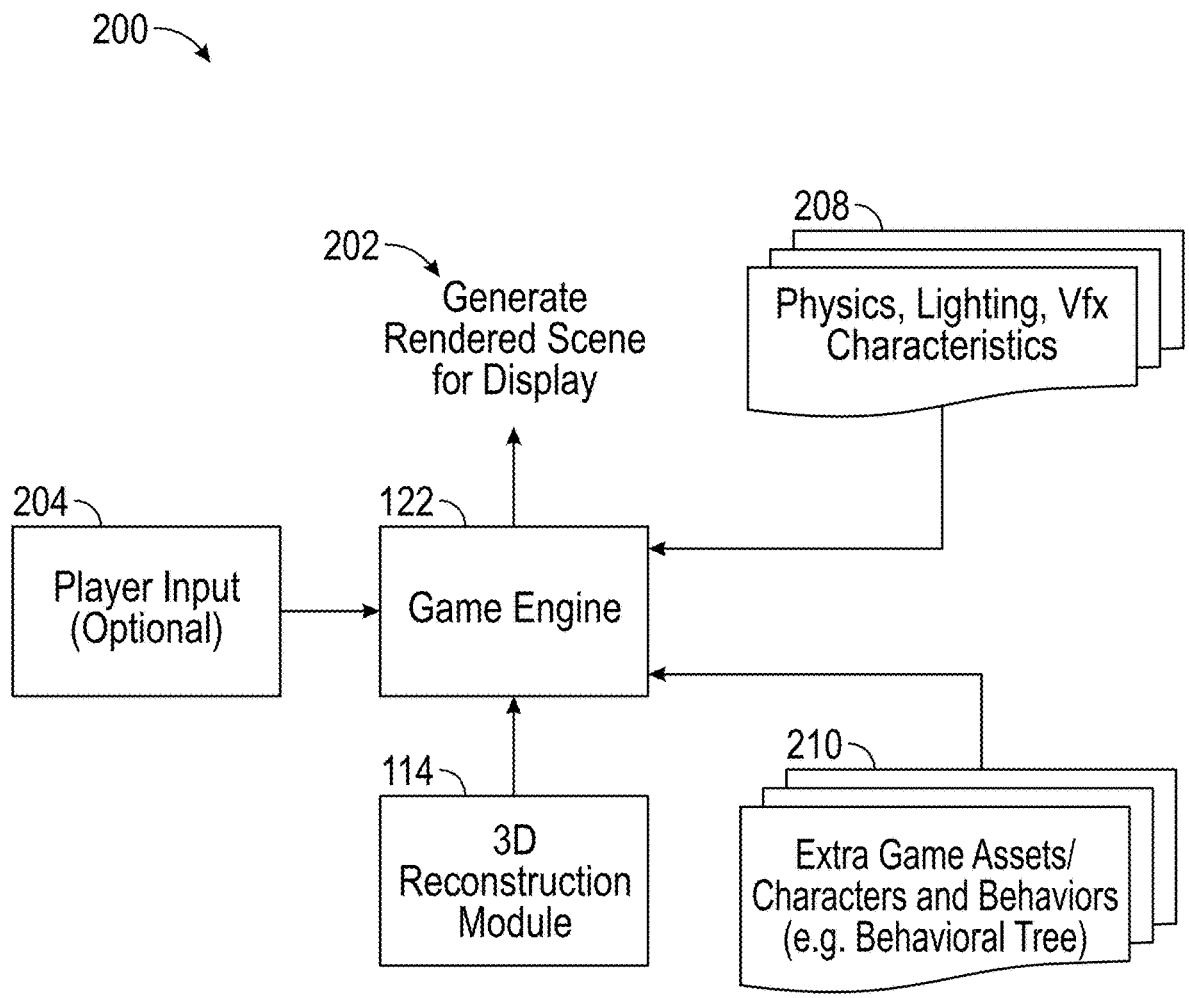
FIG. 2 provides a block diagram for rendering a virtual scene by the game engine and associated data flow according to some embodiments.

FIG. 2 provides a block diagram 200 for rendering a scene by the game engine according to some embodiments. As discussed above, the three dimensional reconstruction system 100 can include a game engine 122, such as the game engine 112 of FIG. 1A. The game engine 122 can receive player input 204, the virtual environment from the three dimensional reconstruction module 114, physics, lighting, and/or visual effects (VFX) characteristics 208, and/or extra game assets/characteristics and behaviors 210. In some embodiments, the three dimensional reconstruction system and/or game engine can receive more or less data than illustrated in FIG. 2. For example, the player input can be optional for the game engine to render a scene for display 202, such as in embodiments in which an augmented camera view or virtual world view is presented without associated interactive game functionality in a given output frame or time period.

In some embodiments, the game engine 112 can receive the three dimensional virtual environment from the three dimensional reconstruction module 114 including three dimensional digital representations of objects and/or features positioned within a three dimensional virtual space.

In some embodiments, the game engine 112 can modify the objects and/or features based on various characteristics. For example, the game engine 112 can optionally receive player input. The game engine can modify a three dimensional representation of an object based on the player input. For example, the player input may be able to select falling leaves from the tree (e.g., virtually shake a real tree). The game engine 112 can modify the placement of a three dimensional representation of a virtual dog to chase after the selected falling leaves.

In some embodiments, the game engine 112 can add effects to the three dimensional representation of objects and/or features, and/or into the virtual space, such as physics, lighting, or VFX (virtual visual effects) characteristics 208. The game engine 112 can add certain visual effects such as explosions into the virtual space. The game engine 112 can add lighting and shadows resulting from the explosions, and/or perform physics calculations to determine how the objects can be thrown aside from the explosion impact.

In some embodiments, the game engine 112 can apply game assets and characters and/or behaviors 210 based on interactions among three dimensional representations of real world objects, three dimensional representations of real world features, and/or pure virtual objects. For example, the game engine 112 can apply a behavioral tree to a three dimensional representation of a real world tree and a purely virtual dog. The virtual dog can jump onto a branch or hide behind the tree. The game engine 112 can identify the three dimensional mesh of the real world tree to perform collision analysis with the dog, as the dog plays by the tree. The game engine 112 can hide portions of the dog as the dog is hidden behind the three dimensional mesh of the tree.

Rendering a Virtual Scene Flow Diagram

Figure 3A:
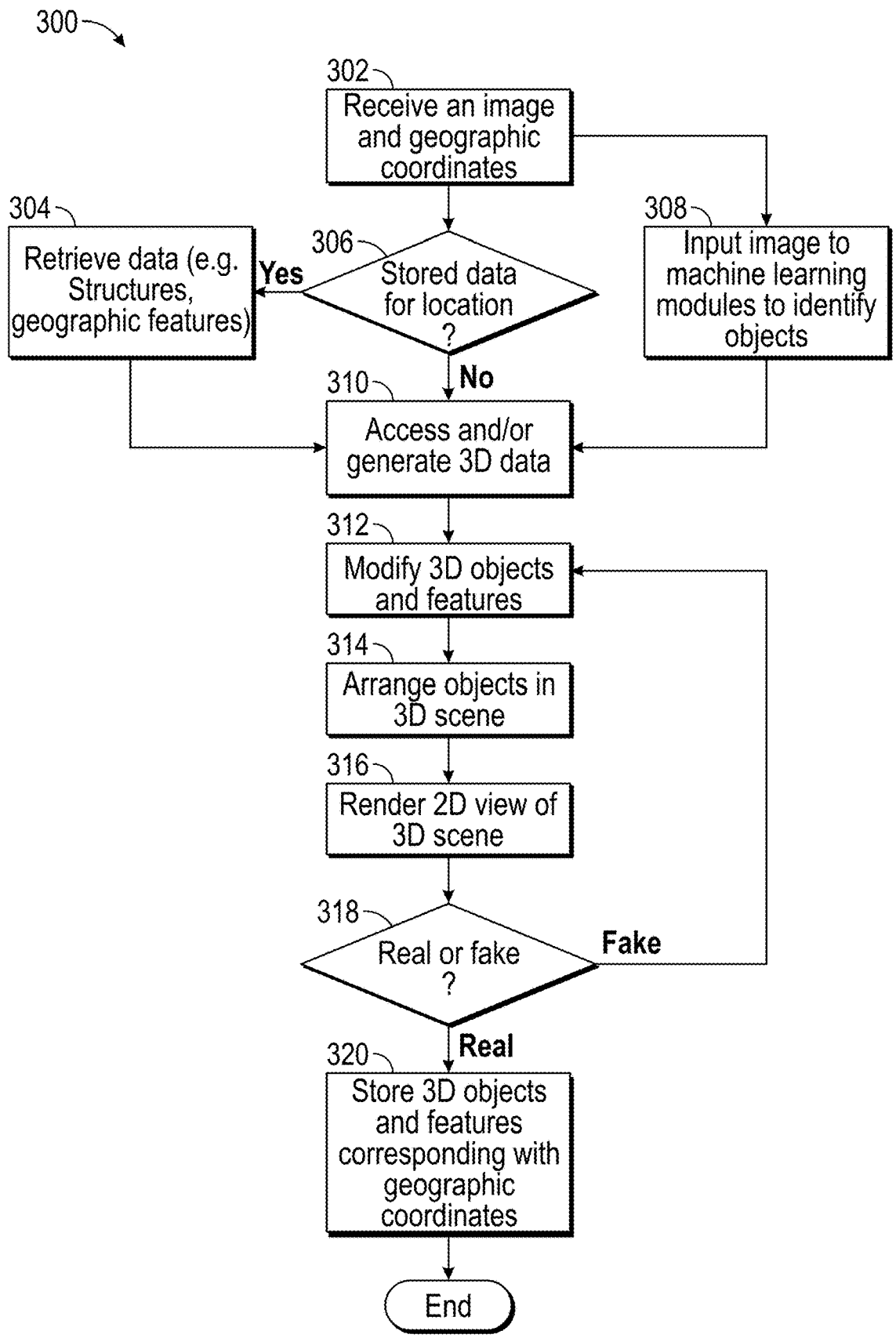
FIG. 3A provides a flow diagram for rendering a scene according to some embodiments.

FIG. 3A provides a flow diagram 300 for rendering a scene according to some embodiments. The process 300 can be implemented by any system that can render a view of a virtual environment. For example, the process 300, in whole or in part, can be implemented by the three dimensional reconstruction module 114, or other computing system. Although any number of systems, in whole or in part, can implement the process 300, to simplify discussion, the process 300 will be described with respect to particular systems. Further, although embodiments of the process 300 may be performed with respect to variations of systems comprising various game development environments and/or game engines, to simplify discussion, the process 300, will be described with respect to the three dimensional reconstruction system.

At block 302, the three dimensional reconstruction system can retrieve, receive or otherwise obtain an image and geographic coordinates from a device. For example, the three dimensional reconstruction system can receive an image taken by a mobile phone of a user. The three dimensional reconstruction system can retrieve a geolocation of the user's mobile phone from a global positioning system component on the mobile phone.

At block 306, the three dimensional reconstruction system can determine whether a database has data, such as feature data (e.g. structure, lake data), corresponding to the identified location of the user. The feature data may be searched for via a mapping service or other service or database that associates features and their real world dimensions to specific GPS locations, as discussed above. Additionally or alternatively, a database may be checked for information previously stored as a result of implementing a similar process as method 300 for a prior user. In one instance, a user can be located between two buildings in a city. The three dimensional reconstruction system can check whether a database has information regarding the two buildings. If yes, at block 304, the three dimensional reconstruction system can retrieve the feature data and proceed to block 310. For example, the three dimensional reconstruction system may have generated and/or modified certain object and/or feature data based on information received by a prior user. A prior user may have taken a picture of one side of a mountain, providing the three dimensional reconstruction system information on the snow, ridges, trees, and slope of the side of the mountain. The three dimensional reconstruction system may have saved the mountain data.

A new user, such as here, can be on the same side of the mountain but at a different angle. The three dimensional reconstruction system can retrieve the previously generated feature data of the mountain for the same side, without having to recreate the database. Moreover, the new user can provide another aspect of the same side of the mountain, such as a closer view of a smaller portion of the mountain, and the three dimensional reconstruction system can modify the retrieved object data (discussed in more detail in block 312 below). If there is no preexisting information for the geographical location, the three dimensional reconstruction system can proceed to block 310. In some embodiments, if there is no preexisting information for the geographical location, the three dimensional reconstruction system can retrieve general information, such as a typical height or texture of a building in the area, can retrieve map data to determine there likely is a building in the location, and/or the like. The three dimensional reconstruction system can then generate a polygon that represents a building, and fill in the textures and shape information with future iterations with users, such as based on an image of a user showing one side of the building.

At block 308 (which may occur before, after or in parallel with blocks 304 and 306), the three dimensional reconstruction system can input the image data into a machine learning module. The three dimensional reconstruction system can receive an output of the machine learning module that can include information and/or characteristics of the image. For example, the three dimensional reconstruction system can receive an identification of segments of the image, such as a first and second portion of the image. The three dimensional reconstruction system can receive an indication of an object and/or object type in the image. For example, the three dimensional reconstruction system can receive an indication that a dog and a tree is in the image. The three dimensional reconstruction system can receive an indication of location and/or relative location of the objects. For example, the three dimensional reconstruction system can receive an indication that the dog is nearby the tree. The three dimensional reconstruction system can generate depth information for objects, such as based on a z-buffer inference, as discussed above.

At block 310, the three dimensional reconstruction system can access and/or generate three dimensional data. The three dimensional reconstruction system can access a three dimensional object, such as an object of a dog. The three dimensional reconstruction system can access three dimensional feature data such as data for a mountain or a building. The three dimensional reconstruction system can generate the three dimensional representation of the object and/or feature. For example, the three dimensional reconstruction system can access a three dimensional mesh of a building, and apply a texture onto the three dimensional mesh. In some embodiments, the texture may be generated based at least in part on a portion of the image corresponding to the detected object in the image.

At block 312, the three dimensional reconstruction system can modify the three dimensional representations of the objects and/or features. For example, the three dimensional reconstruction system can identify that a building is of a certain height or shape. The three dimensional reconstruction system can modify a generated three dimensional representation of a building, generated by generic data, and modify the representation to match the identified height and shape of the object and/or feature. Characteristics of the objects and/or features can be identified from the database storing data for locations and/or from characteristics of the image.

At block 314, the three dimensional reconstruction system can arrange the generated three dimensional representation of objects and/or features into a virtual three dimensional scene, such as a virtual environment. For example, the three dimensional reconstruction system can place a two buildings close to each other, which were identified as located close to the user location. The three dimensional reconstruction system can add a row of trees down a street between the buildings, based on an image taken by the user on the street, where the image shows the row of trees between the two buildings.

At block 316, the three dimensional reconstruction system can render a two dimensional view of the three dimensional scene, such as using standard 3D rendering techniques known in the art given the arranged 3D scene and custom object information described above. The three dimensional reconstruction system can determine whether the two dimensional view appears real and/or fake at block 318, such as using a discriminator in the manner described above. If the three dimensional reconstruction system determines that the image appears to be fake, the process can proceed to 312, where the objects and/or features are remodified, arranged differently in the virtual environment, and/or the camera angle changed for the two dimensional view of the three dimensional scene in an attempt to fool the discriminator again.

In some embodiments, if the three dimensional reconstruction system determines that the image appears to be real, the three dimensional reconstruction system can store the three dimensional scene with the three dimensional objects and/or features (such as including the textures and meshes) in a database. The three dimensional reconstruction system can store the objects and features based on geographical coordinates for later use. For example, certain textures and/or shape information can be identified from the user's camera, and applied to known buildings identified in the geographical location in the feature database. The three dimensional reconstruction system can generate the three dimensional scene with the generated object and/or feature data. The three dimensional reconstruction system can store the three dimensional scene with the generated and/or modified object and/or feature data.

For example, the three dimensional scene can be saved for future use by a future user that would like to play in a similar geographical location. The three dimensional reconstruction system can pull the stored objects and features that were previously generated, apply them to the virtual environment for the future user. If available, the three dimensional reconstruction system can add to the objects and features that may have been further modified based on input from the future user. For example, a future user can take a picture of another side of the building that was not visible by the initial user. Then, the image of the future user can be used to update the building model that may show a different shape or texture that may not be readily apparent from the image from the initial user. In some embodiments, the two dimensional view can be used for in-game purposes. While not illustrated in method 300, the 3D object data may also be used in real time in an augmented reality game separate to or in addition to storing the objects for future use. Then, the process can end or can restart for processing of a next image frame.

Example Rendering of a Building Flow Diagram

Figure 3B:
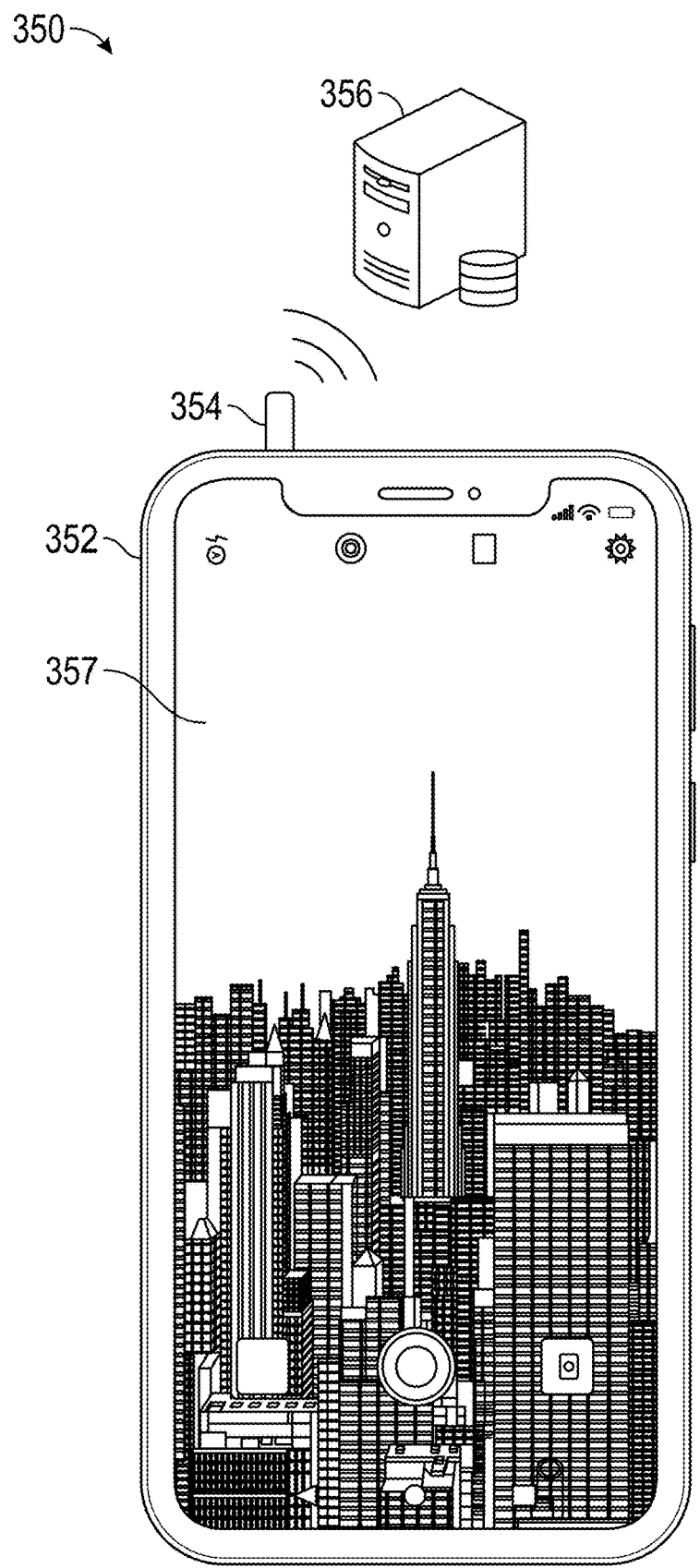
FIG. 3B provides an example of a tablet displaying a real world building according to some embodiments.

FIG. 3B provides an example 350 of a tablet displaying a real world building according to some embodiments. The three dimensional reconstruction system can identify a real-life view based on an image 357 taken by the tablet 352. For example, the three dimensional reconstruction system can identify that the user is in front of the Empire State Building of New York. A tablet 352 can include an antenna 354 that can transmit its geolocation to a cloud server 356 of the three dimensional reconstruction system.

Figure 3C:
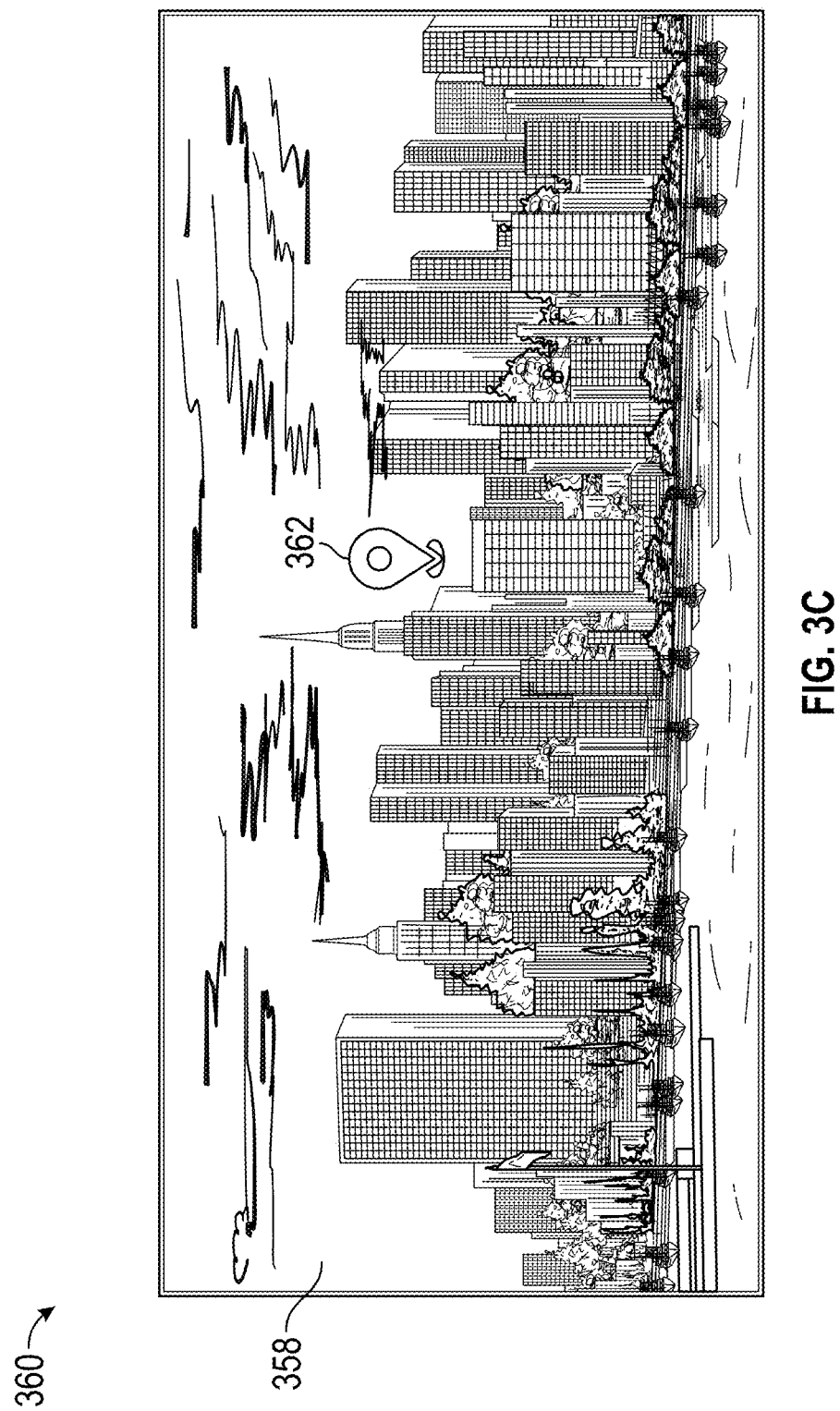
FIG. 3C provides an example of identifying a geolocation and surrounding feature data according to some embodiments.

FIG. 3C provides an example 360 of identifying a geolocation and surrounding feature data according to some embodiments. FIG. 3C illustrates a three dimensional digital representation of a real city with a marker showing where the user is located. The three dimensional digital representation can be very rich in detail, for example, after many iterations where users would have played in the game, taken pictures or shown video streams of what certain objects and/or features look like in real life. The three dimensional reconstruction system can generate textures and meshes of the objects and/or textures through each user's iteration, and generated a more detailed database of details.

For example, for a particular building, the three dimensional reconstruction system may not have prestored details on its texture or mesh. A first user can enter the game, and take a picture of the front of the building. The three dimensional reconstruction system can generate a texture and three dimensional mesh of the front of the building and/or extrapolate a prediction of the texture and/or shape of the entire building. The three dimensional reconstruction system can store the generated and/or modified digital representation of the building. A second user can enter the game on the back side of the building, and may provide an image of the back side of the building. Then, the three dimensional reconstruction system can verify and/or add the data corresponding to the backside of the building. Then for a third user that is nearing the building, the three dimensional reconstruction system can be able to generate a full front and back side digital representation of the building.

In some embodiments, the three dimensional reconstruction system can identify that the user is in front of the Empire State Building 360 in New York City 358. The three dimensional reconstruction system can retrieve feature data of the Empire State Building and other surrounding buildings and place the buildings in a virtual space.

Figure 3D:
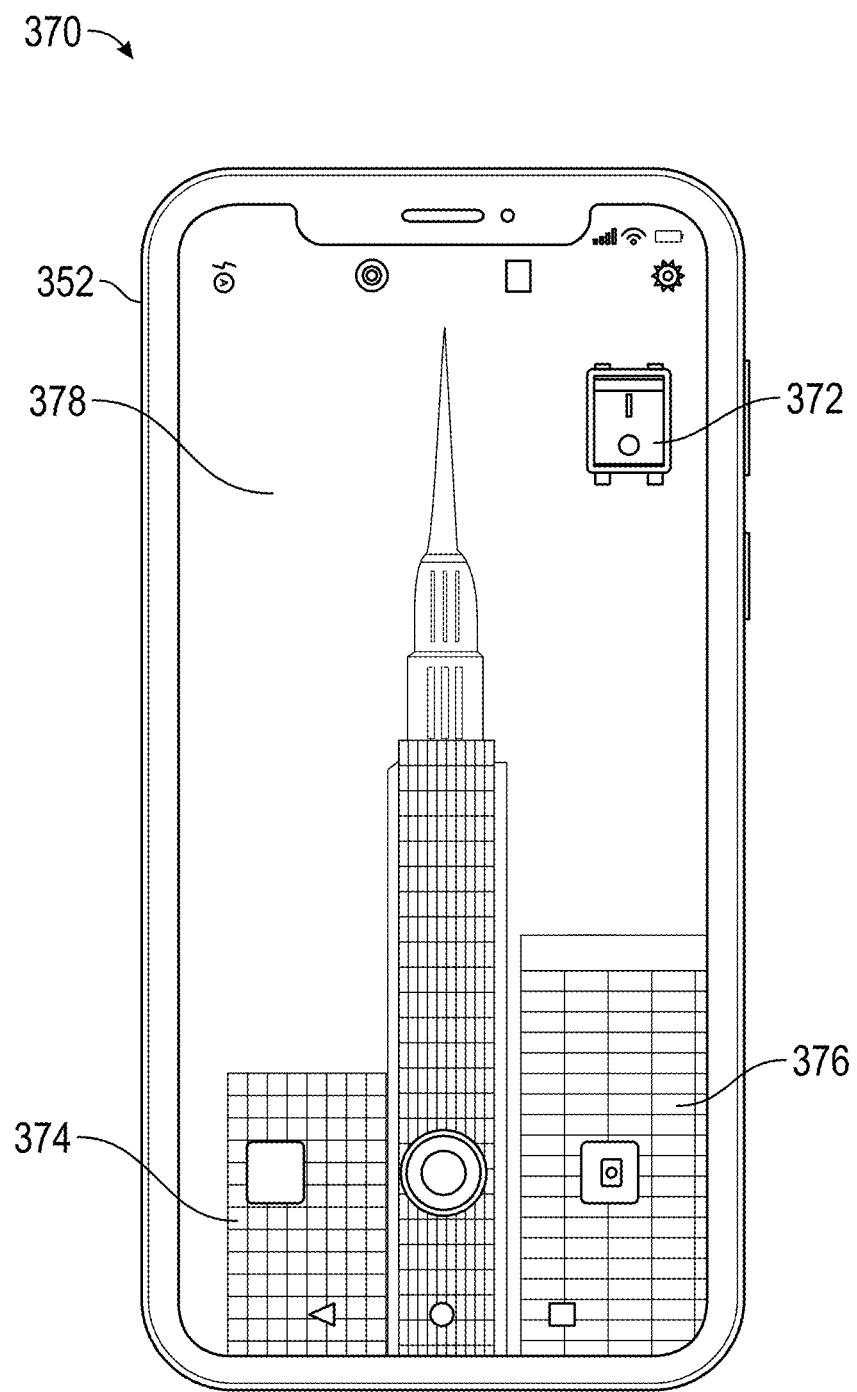
FIG. 3D provides an example of a tablet displaying a three dimensional digital representation of a real world building with a virtual switch according to some embodiments.

FIG. 3D provides an example 370 of the tablet displaying a three dimensional digital representation of a real world building with a virtual switch according to some embodiments. The three dimensional reconstruction system can generate a three dimensional representation 378 of the Empire State Building in the virtual space, with two smaller buildings 374, 376 nearby the Empire State Building. The smaller building 374 can be pure virtual representation of a building that is not in the picture or in the feature data corresponding to the location. The third building 376 can be a view of the real life smaller building next to the Empire State Building. The virtual switch 372 is turned off in example 370.

Figure 3E:
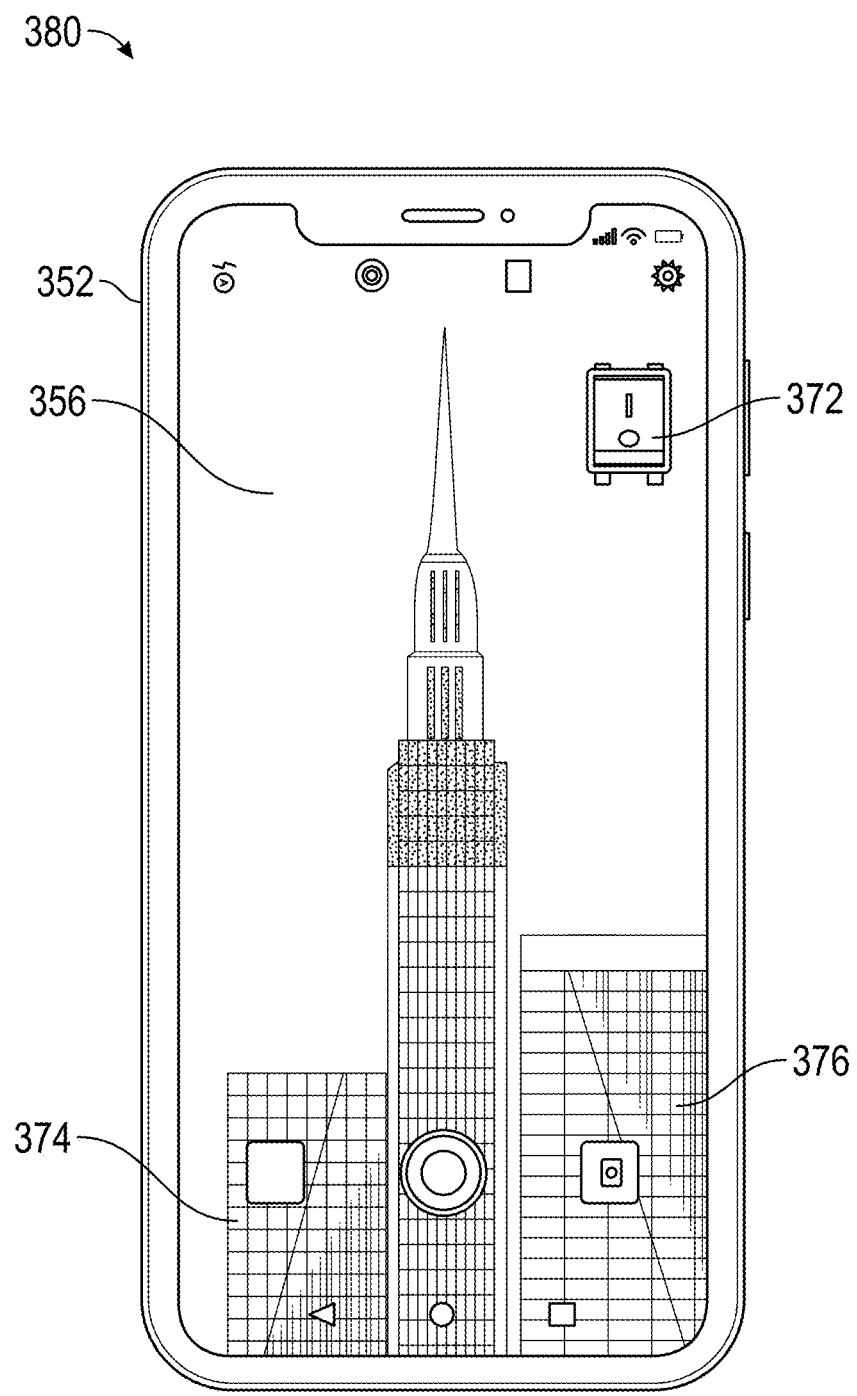
FIG. 3E provides an example of a tablet displaying a three dimensional digital representation of a real world building with virtual lights on the building that cast virtual shadows on nearby buildings according to some embodiments.

FIG. 3E provides an example 380 of a tablet displaying a three dimensional digital representation of a real world building with lights on the building and casting shadows on nearby buildings according to some embodiments. The three dimensional reconstruction system can receive input from a user. For example, the tablet 352 includes a virtual switch 372 that has been switched on. Upon switching on, the three dimensional reconstruction system can illuminate the Empire State Building as displayed within an augmented reality view on the tablet, and turn the lights on for the entire top half of the building. The three dimensional reconstruction system can display a shadow on the smaller buildings 374, 376 as a result of ray tracing from the light radiating from the Empire State Building. Thus, the tablet may display an augmented view of its camera's output, which includes presentation of real objects that have been altered in display to incorporate virtual aspects, where the virtual aspects include virtual light sources that affect display of other real and virtual objects in a realistic manner that takes into account inferred 3D shape of the real objects.

Figure 4A:
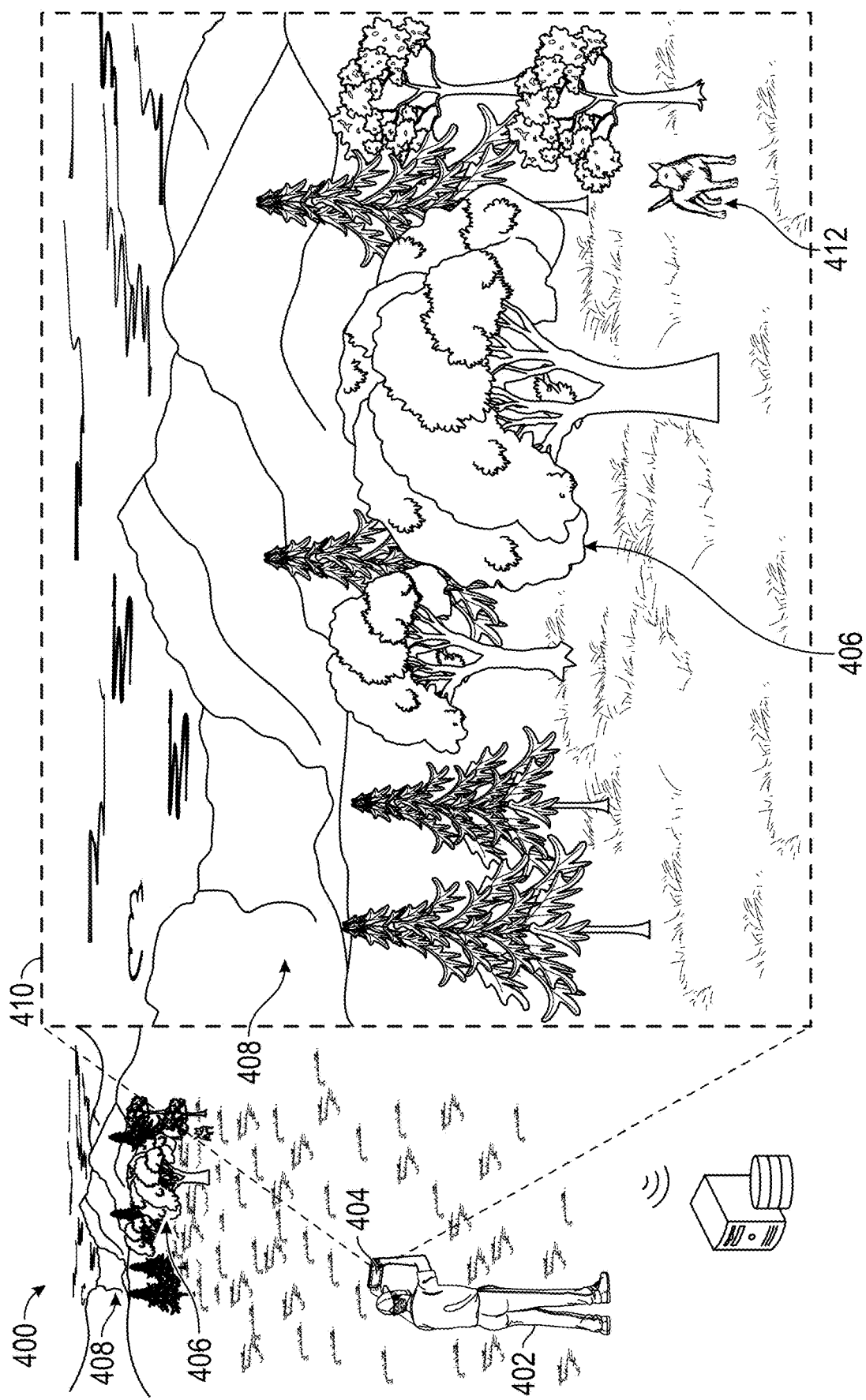
FIG. 4A provides an example of rendering a two dimensional view of real life representations of a tree and mountain, and a three dimensional virtual dog according to some embodiments.

Example of Rendering a Two Dimensional View of Three Dimensional Digital Representations FIG. 4A provides an example 400 of rendering a two dimensional view of real life representations of a tree 406 and a mountain 408, and a three dimensional virtual dog 412 according to some embodiments. A user 402 can be holding his phone 404 nearby a tree 406 and a mountain 408. The display of the phone 404 can display the user's view of the tree 406 and the mountain 408. The three dimensional reconstruction system can generate a virtual dog 412 and place the virtual dog 412 near the real-life tree 406.

Figure 4B:
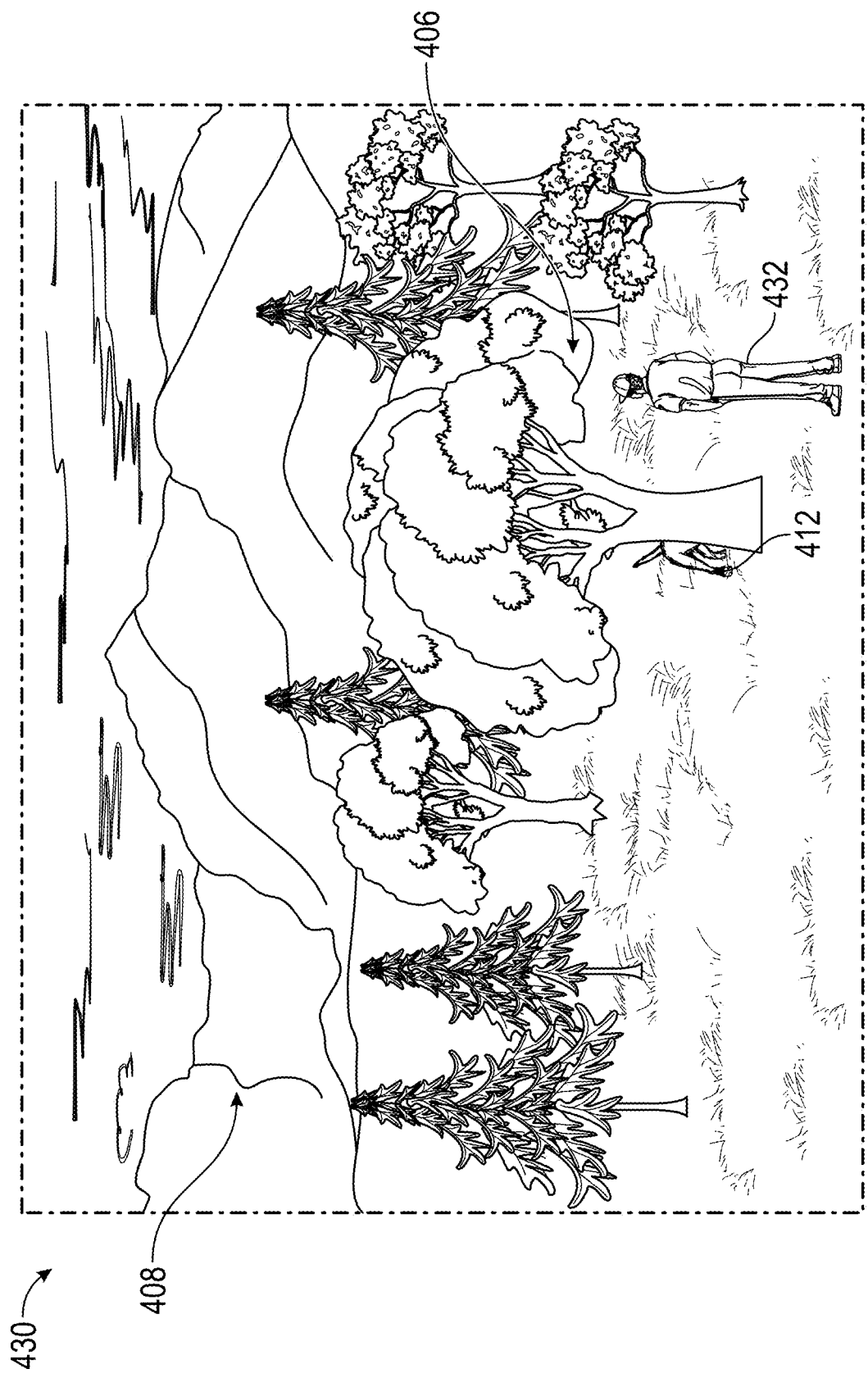
FIG. 4B provides an example of a virtual dog interacting with a real life tree according to some embodiments.

FIG. 4B provides an example 430 of a virtual dog interacting onscreen with a displayed real life tree 412 according to some embodiments. Another user 432 can enter the physical space and move toward the tree. The three dimensional reconstruction system can identify the location of the other user 432 and apply a behavior tree associated with the virtual dog character. Based on the behavior tree or other behavior rule set, the three dimensional reconstruction system can determine that the virtual dog 412 will run away from the other user 432 (e.g., based on a stored behavior rule for the dog indicating that the dog will hide behind a nearby object when approached by a person). Thus, the virtual dog 412 hides behind the tree 406 in the augmented reality view that may be displayed on the user's device. The three dimensional reconstruction system can identify the three dimensional mesh of the tree 406 and hide a portion of the virtual dog 412 that is behind the three dimensional mesh of the tree 406. In some embodiments, a real life object can affect the rendering of a virtual object, and/or vice versa. For example, the real life tree 406 can cast a shadow on the virtual dog 412.

Example of Viewers of Three Dimensional Environment

Figure 5A:
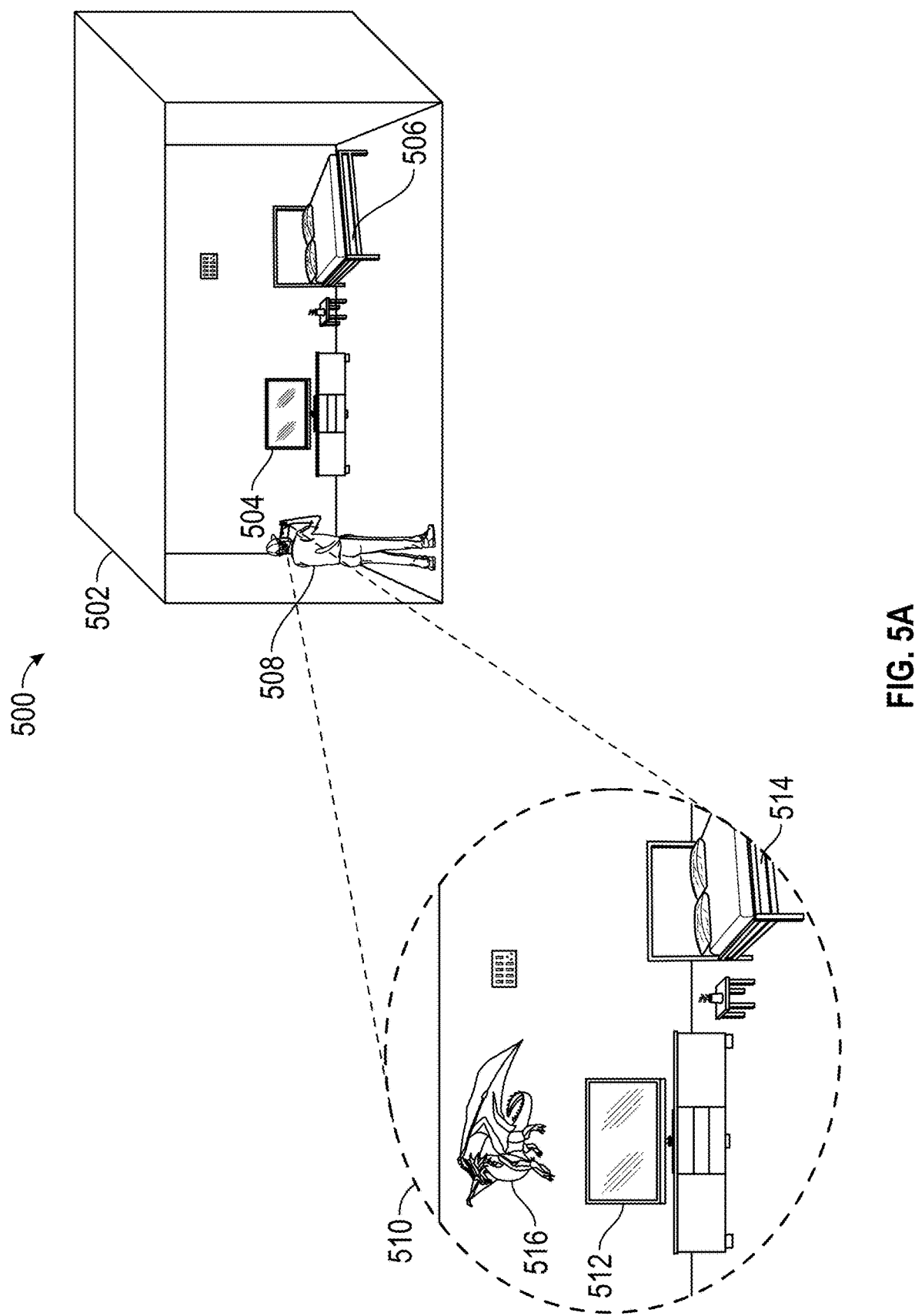
FIG. 5A provides an example of an augmented reality application for a first user according to some embodiments.

FIG. 5A provides an example of an augmented reality application for a first user according to some embodiments. The three dimensional reconstruction system can identify that a user 508 is in a room 502, such as based on geolocation data from a user's phone and/or from an image taken from a camera on a user's phone. The room can include a television system 504 and a bed 506.

In some embodiments, the three dimensional reconstruction system can identify the television system 504 and the bed 506 based on an image taken from a user's phone. For example, the three dimensional reconstruction system may apply one or more machine learning models or classification models on an input image to identify a bed object and television object in the image. The three dimensional reconstruction system can determine dimensions and the shape of the room 502 as feature data based on the user's geolocation and/or based on the input image data (e.g., by identifying planar surfaces corresponding to walls, a floor and a ceiling).

In some embodiments, the three dimensional reconstruction system can render a two dimensional view 510 of the three dimensional virtual space that corresponds to the view of the phone. For example, the two dimensional view 510 can display the real image of the television system 512 and the bed 514 in the user display, such as in an augmented reality application.

In other embodiments, the three dimensional reconstruction system can render a two dimensional view 510 for an augmented reality application. For example, the three dimensional reconstruction system can generate or obtain three dimensional mesh data for the television system 504 and the bed 506. The three dimensional reconstruction system can generate the two dimensional view 510 of the real life television system 504 and the bed 506, and use the three dimensional mesh of the television system 504 and the bed 506 to determine interactions and/or perform collision analysis with a purely virtual dragon 516 that is not in the real world. The three dimensional reconstruction system can determine the three dimensional mesh and texture of the purely virtual dragon 516, and can render a two dimensional view of the dragon 516 in the angle that the camera is facing. The three dimensional reconstruction system can store the three dimensional scene, including the mesh for the television 512, the mesh for the bed 514, and the digital dragon 516.

Figure 5B:
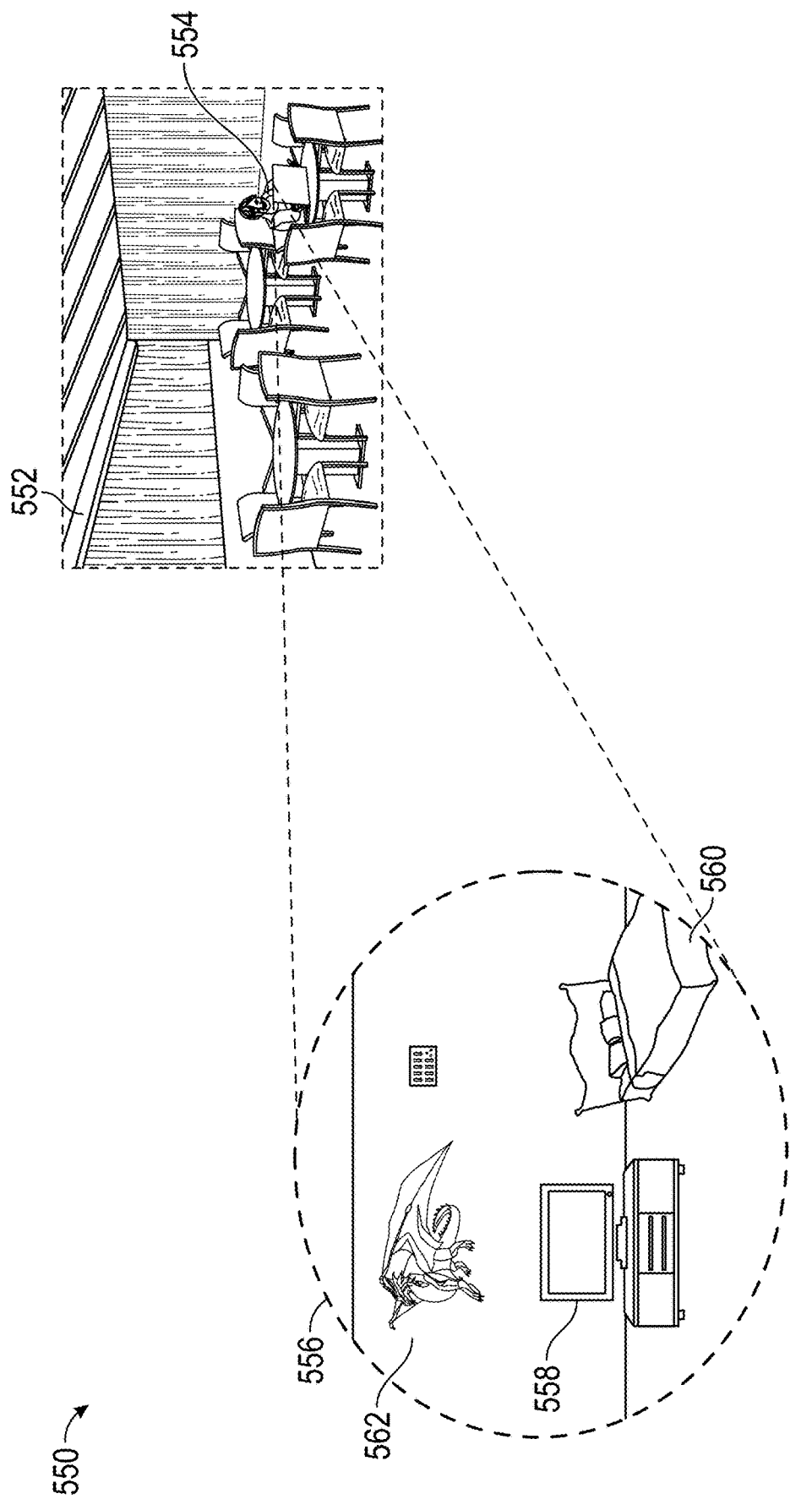
FIG. 5B provides an example of a view from a second remote user device displaying a completely virtual representation of the view for the first user in FIG. 5A according to some embodiments.

FIG. 5B provides an example of a view from a second remote user device displaying a completely virtual representation of the view for the user 508 in FIG. 5A according to some embodiments. In some embodiments, another user 554, such as a remote user, can play in the same virtual environment of the user 508 in FIG. 5A. In some embodiments, the other user 554 can view and/or replay the view of the user 508, but may see a fully virtual rendering of the first user's room rather than an augmented reality view that the first user saw when playing.

In some embodiments, the three dimensional reconstruction system can generate a purely virtual view of the augmented view for the user 508 in FIG. 5A, and/or vice versa. For example, the three dimensional reconstruction system can access the three dimensional virtual space from a database. The three dimensional reconstruction system can apply textures to the three dimensional mesh of the television set 558 and the bed 560, and display a two dimensional view of the three dimensional digital representation of the television set 558 and the bed 560. In one embodiment, a user may play a game in an augmented reality view, but that same user may then watch a replay of the game session in a purely rendered, virtual view.

Example of Viewers of Three Dimensional Environment

Figure 6A:
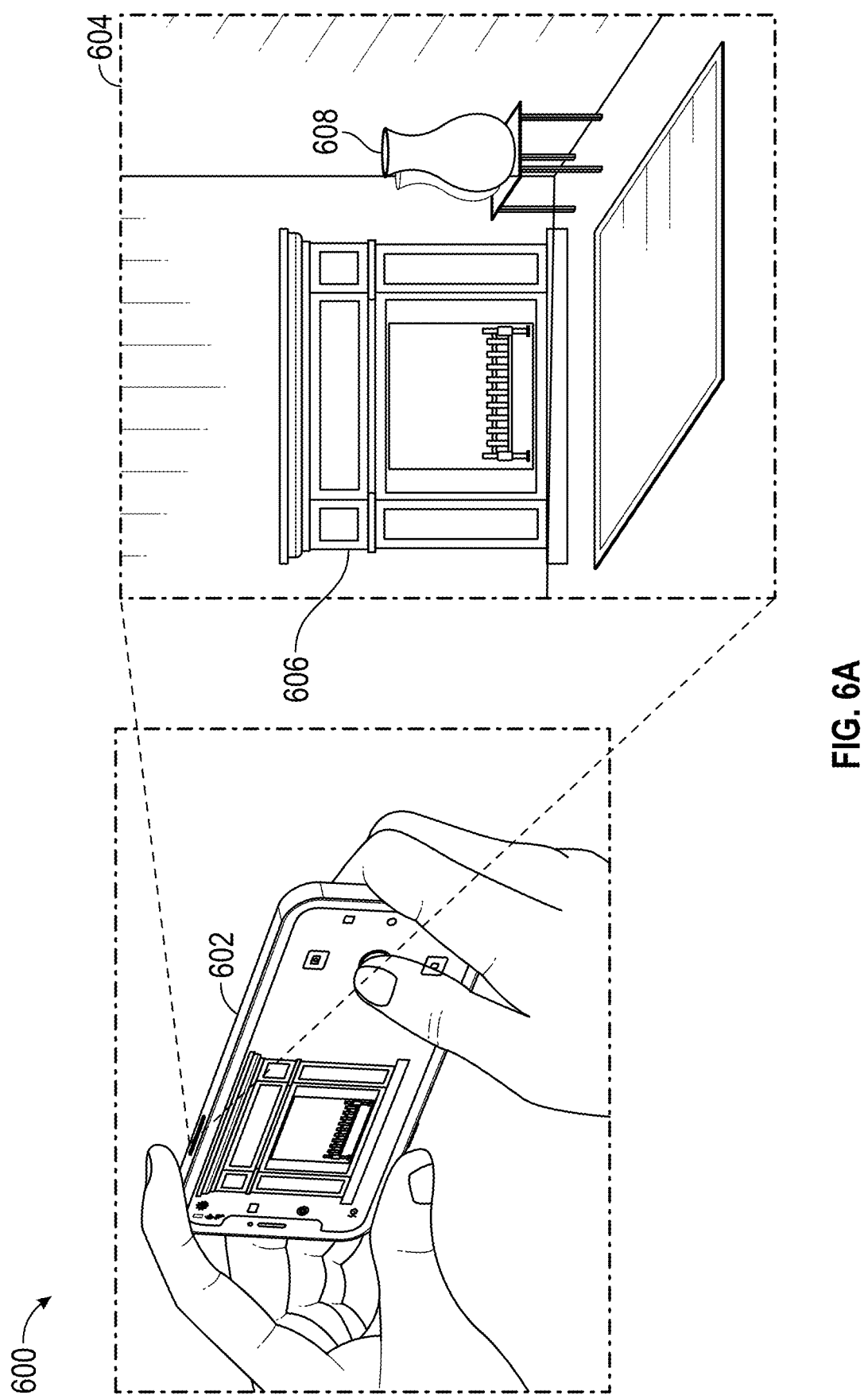
FIG. 6A provides an example of a real-life fireplace with a real-life vase according to some embodiments.

FIG. 6A provides an example 600 of a real-life fireplace with a real-life vase according to some embodiments. In some embodiments, a user can be viewing a real room 604 with a real world fireplace 606 and a real vase 608 on the graphical user interface 602. The real world fireplace 606 does not have a fire burning at the moment, and a real light source present in the real room 604 is casting a real world shadow on the left side of the real vase 608.

Figure 6B:
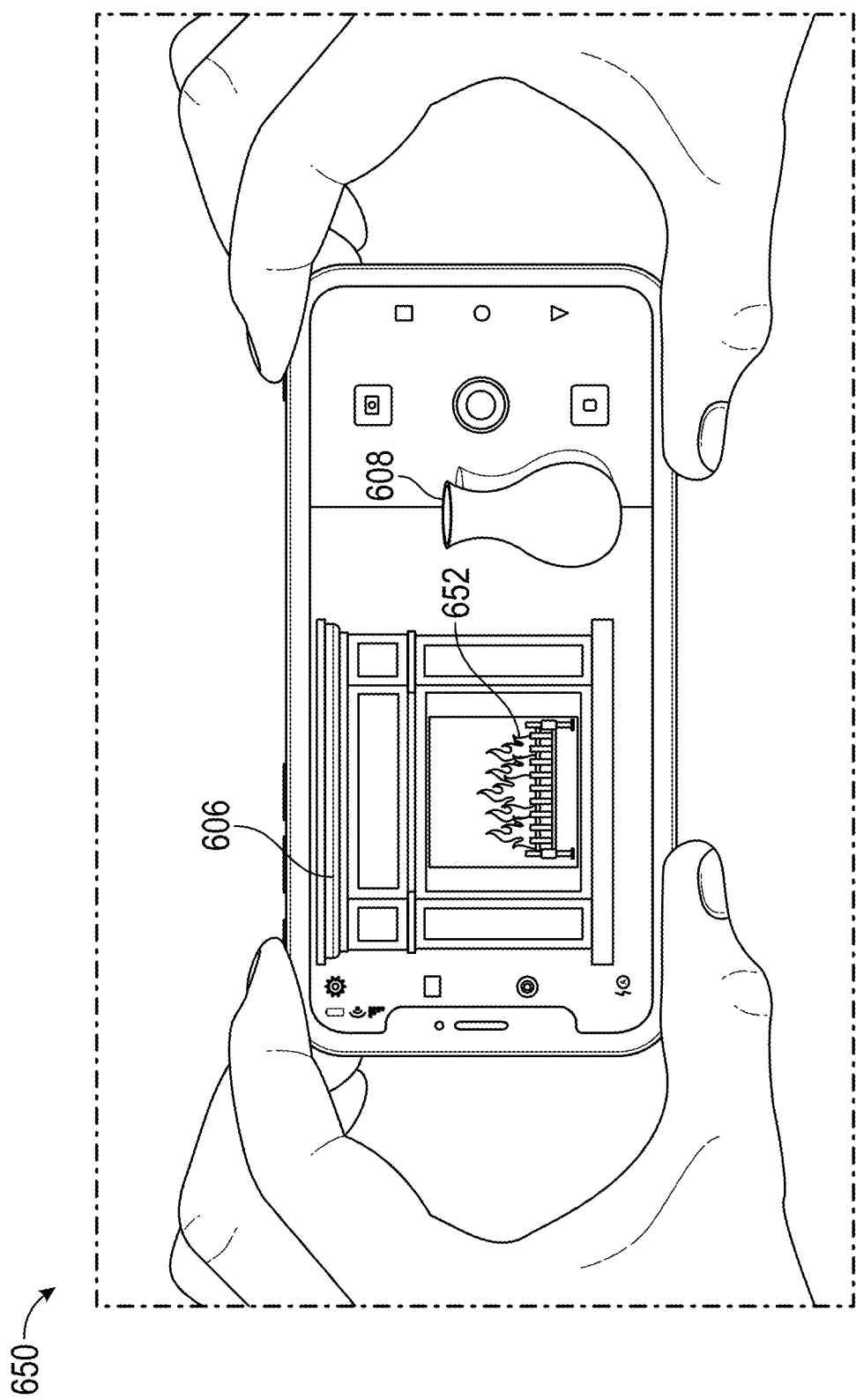
FIG. 6B provides an example of a real-life fireplace with a virtual fire creating a virtual shadow for the real-life vase according to some embodiments.

FIG. 6B provides an example of the same real-life fireplace with a virtual fire creating a virtual shadow for the real-life vase according to some embodiments. The three dimensional reconstruction system can determine the three dimensional mesh of the vase 608 and the fireplace 606 in the room. The three dimensional reconstruction system can generate a virtual fire 652 by applying a fire texture onto a fire three dimensional mesh. The three dimensional reconstruction system can place the fire in between the left and right walls of the three dimensional mesh of the fireplace.

In some embodiments, the three dimensional reconstruction system can identify a characteristic of a purely virtual object that can affect a digital representation of a real world object, and/or vice versa. For example, the three dimensional reconstruction system can determine that the virtual fire 652 radiates a stronger light than the light of the real world room 604. The three dimensional reconstruction system can perform ray tracing to determine that a shadow should be cast on the other side of the vase 608 (the right side), instead of the left side generated by the light source of the real room 604.

Overview of Computing Device

Figure 7:
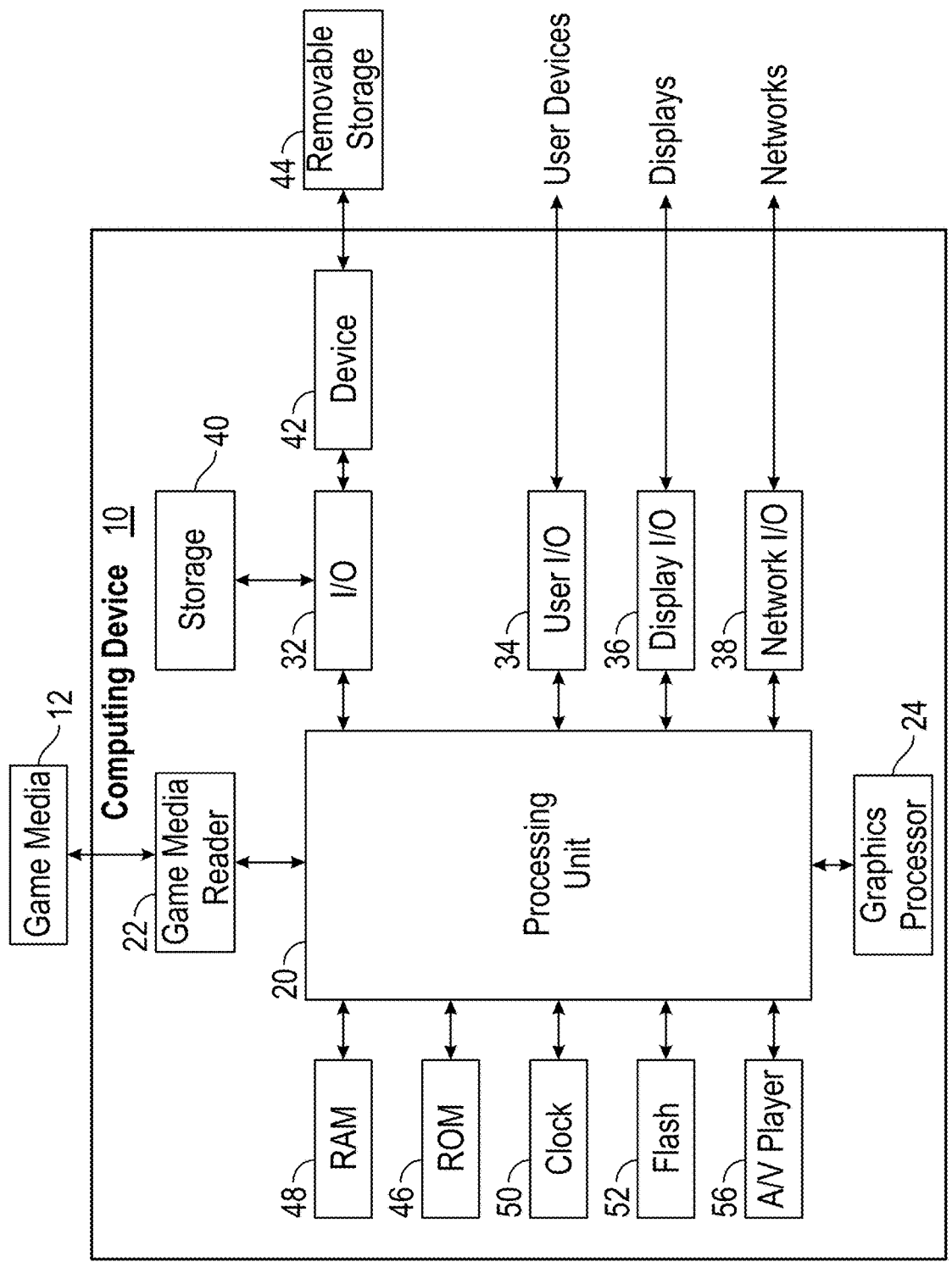
FIG. 7 illustrates an embodiment of computing device that may implement aspects of the present disclosure.

FIG. 7 illustrates an embodiment of computing device 10. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10. The computing device 10 can include one or more components for the interactive computing system 160, and/or a player computing system 152A, 152B. In some embodiments, the interactive computing system 160, and/or a player computing system 152A, 152B can include one or more components of the computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
receiving a first image and a first geolocation from a first user device, wherein the first image has been captured by a camera of or communicatively coupled to the first user device at the first geolocation;
receiving map data that includes the first geolocation of the first user device;
identifying an object depicted in the first image, wherein a first portion of the object is portrayed in the first image;
determining an object geolocation for the object based on the map data;
determining a first characteristic for the first portion of the object based on the received first image;
searching a database for one or more known objects within a certain geographic proximity of the object geolocation;
determining that the object corresponds to a known object in the database based on a geolocation of the known object being within the geographic proximity of the object geolocation;
obtaining one or more characteristics of the known object from the database;
determining a shape of the object based on the one or more characteristics of the known object, wherein the shape includes a second portion of the object that is not portrayed in the first image;
generating a three dimensional representation of the object based on the first characteristic of the object, wherein the three dimensional representation of the object includes an inferred representation of the second portion of the object that is not portrayed in the first image, wherein the inferred representation of the second portion of the object is determined based on the one or more characteristics of the known object;
storing, in an electronic data store, the three dimensional representation of the object;
generating one or more renderings of the three dimensional representation of the object in an instance of a virtual video game environment for display by a plurality of video gaming systems that execute a video game application;

receiving a second image and a second geolocation from a second user device, wherein the second image has been captured by a camera of or communicatively coupled to the second user device at the second geolocation;

obtaining, from the electronic data store, three dimensional object data corresponding to characteristics of objects in the surrounding geolocation of the second user device including the three dimensional representation of the object;

determining that the second portion of the object is visible from the second geolocation;

determining a second characteristic of the second portion of the object based on the second image, wherein the second portion of the object is displayed in the second image but not in the first image;

determining that the second portion of the object included in the three dimensional representation does not match the object as depicted in the second image;

modifying the inferred representation of the second portion of the object included in the three dimensional representation of the object based on the second characteristic as depicted in the second image to generate a modified three dimensional object representation, wherein at least a portion of the three dimensional representation of the object is unchanged by the modifying of the inferred representation of the second portion;

storing, in the electronic data store, the modified three dimensional object representation;

updating the object in the virtual video game environment for at least a subset of video gaming systems executing the video game application by incorporating the modified three dimensional object representation into the virtual video game environment; and causing to display, by at least one of the video gaming systems executing the video game application, a portion of the virtual video game environment including the updated object.

2. The computer-implemented method of claim 1, wherein the machine learning model is configured to segment an input image, identify objects in the input image, and determine depths of identified objects in the input image.

3. The computer-implemented method of claim 1 further comprising identifying one or more features corresponding to the first geolocation from a database, and generating a three dimensional representation of the one or more features.

4. The computer-implemented method of claim 1, wherein the characteristics of the objects are retrieved from a database that stores data associating geolocation information to object characteristics.

5. The computer-implemented method of claim 1, wherein the characteristics of the corresponding objects are identified by one or more machine learning models.

6. The computer-implemented method of claim 1, wherein the characteristics include at least one of: a height, a width, a length, or a shape.

7. The computer-implemented method of claim 1, wherein the method further comprises arranging two or more modified three dimensional object representations in the virtual video game environment based on relative location of the modified three dimensional object representation with other objects depicted in the first image.

8. The computer-implemented method of claim 1, wherein generating the one or more renderings comprises rending a two dimensional view from a virtual camera with a virtual position corresponding to a position of a real camera that captured the first image.

9. The computer-implemented method of claim 8, wherein the method further comprises:

arranging the one or more modified three dimensional object representations in a three dimensional virtual space, wherein the one or more renderings are of the three dimensional virtual space; and determining a comparison between the two dimensional view and the first image by determining a percentage of pixels that meets a threshold requirement from a pixel by pixel comparison.

10. A system comprising:

one or more processors configured with computer executable instructions that configure the one or more processors to:

receive a first image and a first geolocation from a first user device, wherein the first image has been captured by a camera of or communicatively coupled to the first user device at the first geolocation;

receive map data that includes the first geolocation of the first user device;

identify an object depicted in the first image, wherein a first portion of the object is portrayed in the first image;

determine an object geolocation for the object based on the map data;

determine a first characteristic for the first portion of the object based on the received first image;

search a database for one or more known objects within a certain geographic proximity of the object geolocation;

determine that the object corresponds to a known object in the database based on a geolocation of the known object being within the geographic proximity of the object geolocation;

obtain one or more characteristics of the known object from the database;

determine a shape of the object based on the one or more characteristics of the known object, wherein the shape includes a second portion of the object that is not portrayed in the first image;

generate a three dimensional representation of the object based on the first characteristic of the object, wherein the three dimensional representation of the object includes an inferred representation of the second portion of the object that is not portrayed in the first image, wherein the inferred representation of the second portion of the object is determined based on the one or more characteristics of the known object;

store, in an electronic data store, the three dimensional representation of the object;

generate one or more renderings of the three dimensional representation of the object in an instance of a virtual video game environment for display by a plurality of video gaming systems that execute a video game application;

receive a second image and a second geolocation from a second user device, wherein the second image has been captured by a camera of or communicatively coupled to the second user device at the second geolocation;

obtain, from the electronic data store, three dimensional object data corresponding to characteristics of objects in the surrounding geolocation of the second user device including the three dimensional representation of the object;

determine that the second portion of the object is visible from the second geolocation;

determine a second characteristic of the second portion of the object based on the second image, wherein the second portion of the object is displayed in the second image but not in the first image;

determine that the second portion of the object included in the three dimensional representation does not match the object as depicted in the second image;

modify the inferred representation of the second portion of the object included in the three dimensional representation of the object based on the second characteristic as depicted in the second image to generate a modified three dimensional object representation, wherein at least a portion of the three dimensional representation of the object is unchanged by the modifying of the inferred representation of the second portion;

store, in the electronic data store, the modified three dimensional object representation; and update the object in the virtual video game environment for at least a subset of video gaming systems executing the video game application by incorporating the modified three dimensional object representation into the virtual video game environment.

11. The system of claim 10, wherein the characteristics of the corresponding objects are identified by the machine learning model, and the characteristics are verified based on data obtained from a database that stores data corresponding geolocation data to object characteristics.

12. The system of claim 10, wherein the characteristics of the objects are obtained from a database that stores data corresponding geolocation data to object characteristics, and the characteristics are verified based on data identified by a machine learning model.

13. The system of claim 10, wherein the first user device includes a mobile phone or an augmented reality device.

14. The system of claim 10, wherein the one or more processors are further configured to cause rendering of a two dimensional view by the first user device.

15. The system of claim 10, wherein the one or more processors are further configured to:

receive geolocation data based on the second geolocation of the second user device that is within a proximity distance from the first geolocation of the first user device;

retrieve the virtual video game environment corresponding to the geolocation data;

remodify the three dimensional representation of the object based on the virtual video game environment; and store an updated version of the virtual video game environment with the remodified three dimensional representation of the object.

16. The system of claim 10, wherein the one or more processors are further configured to:

generate a rendered scene by generating a fully virtual rendered scene for the first user device; and generate an augmented reality rendered scene for a second user device by retrieving the virtual video game environment with the three dimensional representation of the object.

17. The system of claim 10, wherein the one or more processors are further configured to:

generate a rendered scene by generating an augmented reality rendered scene for the first user device; and generate a fully virtual rendered scene for a second user device by retrieving the virtual video game environment with the three dimensional representation of the object.

18. The system of claim 10, wherein the one or more processors are further configured to cause to display, by at least one of the video gaming systems executing the video game application, a portion of the virtual video game environment including the updated object.

19. A non-transitory computer-readable storage medium having stored thereon instructions that, when executed, cause at least one processor to:

receive a first image and a first geolocation from a first user device, wherein the first image has been captured by a camera of or communicatively coupled to the first user device at the first geolocation;

receive map data that includes the first geolocation of the first user device;

identify an object depicted in the first image, wherein a first portion of the object is portrayed in the first image;

determine an object geolocation for the object based on the map data;

determine a first characteristic for the first portion of the object based on the received first image;

search a database for one or more known objects within a certain geographic proximity of the object geolocation;

determine that the object corresponds to a known object in the database based on a geolocation of the known object being within the geographic proximity of the object geolocation;

obtain one or more characteristics of the known object from the database;

determine a shape of the object based on the one or more characteristics of the known object, wherein the shape includes a second portion of the object that is not portrayed in the first image;

generate a three dimensional representation of the object based on the first characteristic of the object, wherein the three dimensional representation of the object includes an inferred representation of the second portion of the object that is not portrayed in the first image, wherein the inferred representation of the second portion of the object is determined based on the one or more characteristics of the known object;

store, in an electronic data store, the three dimensional representation of the object;

generate one or more renderings of the three dimensional representation of the object in an instance of a virtual video game environment for display by a plurality of video gaming systems that execute a video game application;

receive a second image and a second geolocation from a second user device, wherein the second image has been captured by a camera of or communicatively coupled to the second user device at the second geolocation;

obtain, from the electronic data store, three dimensional object data corresponding to characteristics of objects in the surrounding geolocation of the second user device including the three dimensional representation of the object;

determine that the second portion of the object is visible from the second geolocation;

determine a second characteristic of the second portion of the object based on the second image, wherein the second portion of the object is displayed in the second image but not in the first image;

determine that the second portion of the object included in the three dimensional representation does not match the object as depicted in the second image;

modify the inferred representation of the second portion of the object included in the three dimensional representation of the object based on the second characteristic as depicted in the second image to generate a modified three dimensional object representation, wherein at least a portion of the three dimensional representation of the object is unchanged by the modifying of the inferred representation of the second portion;

store, in the electronic data store, the modified three dimensional object representation; and update the object in the virtual video game environment for at least a subset of video gaming systems executing the video game application by automatically incorporating the modified three dimensional object representation into the virtual video game environment.

20. The non-transitory computer-readable storage medium of claim 19, wherein the processor is further configured to generate a virtual object that was not identified in the image, and apply a behavioral tree associated with the virtual object to identify behavior and interaction of the virtual object with the identified one or more objects in the image.

* * * * *